(12) United States Patent
Pein

(10) Patent No.: US 7,056,202 B2
(45) Date of Patent: Jun. 6, 2006

(54) METHOD AND DEVICE FOR SLAUGHTERING FISH IN PARTICULAR WHITE FISH

(75) Inventor: Ronald Pein, Herrnburg (DE)

(73) Assignee: Nordischer Maschinenbau Rud.Baader GmbH & Co KG, Lubeck (DE)

( * ) Notice: Subject to any disclaimer, the term of this patent is extended or adjusted under 35 U.S.C. 154(b) by 35 days.

(21) Appl. No.: 10/468,024

(22) PCT Filed: Feb. 14, 2002

(86) PCT No.: PCT/EP02/01585

§ 371 (c)(1), (2), (4) Date: Aug. 14, 2003

(87) PCT Pub. No.: WO02/063967

PCT Pub. Date: Aug. 22, 2002

(65) Prior Publication Data

US 2004/0072525 A1  Apr. 15, 2004

(30) Foreign Application Priority Data

Feb. 14, 2001  (DE) ................. 101 08 793

(51) Int. Cl.
A22C 25/08 (2006.01)
A22C 25/14 (2006.01)
A22C 25/18 (2006.01)

(52) U.S. Cl. ............... 452/161; 452/64; 452/108; 452/150

(58) Field of Classification Search ........ 452/63, 452/64, 107, 108, 121, 150, 151, 155, 160, 452/161, 162, 163, 164
See application file for complete search history.

(56) References Cited

U.S. PATENT DOCUMENTS

| 1,744,726 | A | * | 1/1930 | Baader ............... 452/121 |
| 3,380,114 | A | * | 4/1968 | Hartl et al. ............ 452/108 |
| 4,551,885 | A | * | 11/1985 | Molnar ............... 452/119 |
| 4,979,268 | A |   | 12/1990 | Kure |
| 5,032,105 | A | * | 7/1991 | Gronbech ............. 452/108 |
| 5,083,972 | A | * | 1/1992 | King ................. 452/108 |
| 5,462,478 | A | * | 10/1995 | Fredsby et al. ........ 452/135 |
| 5,505,658 | A | * | 4/1996 | Palmason ............. 452/196 |
| 5,735,735 | A |   | 4/1998 | Hahn et al. |

FOREIGN PATENT DOCUMENTS

EP 0258941 * 3/1988
GB 230381  3/1925

(Continued)

*Primary Examiner*—Peter M. Poon
*Assistant Examiner*—David Parsley
(74) *Attorney, Agent, or Firm*—Mattingly, Stanger, Malur & Brundidge, P.C.

(57) ABSTRACT

A device and method for slaughtering fish, in particular white fish, has at least one fish receptacle for positioning and receiving the fish, a throat cutting apparatus for cutting through the throat in preparation for the pharynx cut, a pharynx cutting apparatus for completely cutting through the pharynx, a slaughtering apparatus for opening the abdominal cavity, a gut severing apparatus for releasing the entrails from the abdominal cavity and a peripheral fish receiving drum with which the fish can be moved to the individual processing stations. The fish receiving drum is driven intermittently in rotation about a horizontal shaft. The fish are movable transversely to their longitudinal axis on an essentially vertical circular path. The fish receptacle includes pectoral fin receptacles and a torso clamp for fixing the fish torsos. Also, a head support with a head clamp is provided.

65 Claims, 19 Drawing Sheets

FOREIGN PATENT DOCUMENTS

| | | | |
|---|---|---|---|
| GB | 515764 | | 12/1939 |
| GB | 1048149 | | 11/1966 |
| JP | 59-169443 | * | 9/1984 |
| JP | 60-98935 | * | 6/1985 |
| JP | 62-163653 | * | 7/1987 |
| JP | 62-296835 | * | 12/1987 |
| JP | 63-36738 | * | 2/1988 |
| JP | 4-91748 | * | 3/1992 |

* cited by examiner

METHOD AND DEVICE FOR SLAUGHTERING FISH IN PARTICULAR WHITE FISH

BACKGROUND OF THE INVENTION (1) Field of the Invention

The invention concerns a device and method for slaughtering fish, in particular white fish.

(2) Description of Related Art

In devices and methods of the known kind, after a manual throat cut the fish are laid in fish receptacles of the fish receiving drum and moved continuously past the individual work stations which are located in the region of the circular path of the drum. It also happens that the fish are laid without their throats cut in the known devices. The fish receiving drum is rotatable about a vertical shaft, so that the fish are laid in the fish receptacles with the head pointing upwards (that is, in a vertical position) and with the tail at the bottom, and moved on an essentially horizontal circular path.

In devices of the above-mentioned kind, it is of particular importance that on the one hand the ergonomic conditions for the operator meet the requirements and on the other hand the unheaded fish are opened in the region of the gill cavity without the collarbones and collarbone tip of the respective fish being damaged, the abdominal cavity is opened with a central cut and the entrails are removed from the abdominal cavity undamaged. Optionally, and in fact depending on the fish species, the fish size and other conditions which define the state of the fish, the slaughter cut is to be made in the direction of the tail as far as the anus or beyond it. The fish torsos, fish heads and entrails are to be capable of being carried away separately from each other. Furthermore it is desirable that the device can be used universally, e.g. for slaughtering and/or heading with or without prior throat cutting.

All the above devices and methods, however, have the disadvantage that they display unfavourable ergonomics for the operator, particularly against the background that the devices are used mainly on board fishing boats/trawlers which sometimes have a deck height of not more than 2 m. In the known devices, the operator must bend over the device on account of the arrangement of the fish receiving drum, which is possible only with great difficulty in the cramped conditions. Further, the operator must perform lifting work due to the position of the fish in the fish receptacle, which, considered over the day/shift, on account of the heavy weight is an enormous physical burden. Furthermore, the cutting results with the known devices and methods are not satisfactory, particularly as far as preparation of the fish for further processing as saltfish is concerned. A further disadvantage lies in that the entrails are destroyed with the traditional devices or during the known methods, so that they are no longer usable or contaminate the fish or abdominal cavity with germs or the like. Due to the fact that the fish are transported and processed in vertical orientation, there is a lack of head support, leading to inconsistent and imprecise cuts, as the head is movable throughout processing. As a result of this, moreover, the head cannot be carried away at any location due to the lack of fixing. Continuous transport of the fish at the individual processing stations also leads to the cutting results being sometimes inadequate, as precise processing on a moving object is very difficult or requires very high structural expenditure. In the event that the fish are laid without their throats cut in the fish receptacles, the pharynx cutting apparatus cuts throat, membrane and pharynx in one. However, this leads to a cut which damages the collarbones and is imprecise in guiding the cut. Further, by a method without prior throat cutting it is not ensured that the membrane is reliably severed from the entrails.

BRIEF SUMMARY OF THE INVENTION

The present invention is directed to a device for slaughtering fish, particularly white fish. The device includes at least one fish receptacle for positioning and receiving the fish, a throat cutting apparatus for cutting through the throat in preparation for the pharynx cut, a pharynx cutting apparatus for completely cutting through the pharynx, a slaughtering apparatus for opening the abdominal cavity, a gut severing apparatus for releasing the entrails from the abdominal cavity, and a peripheral fish receiving drum with which the fish can be moved to the individual processing stations.

Further, the invention is direct to a method for slaughtering fish, in particular white fish, including the steps of laying the fish in fish receptacles of a fish receiving drum, cutting open the throats of the fishes in preparation for the pharynx cut by means of a throat cutting apparatus, completely cutting through the pharynx with a pharynx cutting apparatus, opening the abdominal cavity with a slaughtering apparatus, releasing the entrails with a gut severing apparatus, wherein the fish with the fish receiving drum are moved successively to the individual processing stations.

It is therefore the object of the present invention to propose a device and a method with which simplified handling is guaranteed during slaughtering particularly of white fish within a size range from 35 to 90 cm and at the same time the slaughtering result is improved.

The object is achieved according to the invention by a device of the kind mentioned hereinbefore by the fact that the fish receiving drum which is driven intermittently is rotatable about a horizontal shaft, in such a way that the fish are movable on an essentially vertical circular path. Due to the construction of the device according to the invention, firstly it is ensured that ergonomic aspects have been improved and so handling has been considerably simplified, as laying the fish in the receiving drum is made easier and the fish can therefore be laid in the fish receptacles without substantial lifting work. Also, a compact design is guaranteed by the horizontal shaft of the fish receiving drum, which in particular allows installation in narrow spaces. Secondly, the intermittent drive of the fish receiving drum allows very precise processing of the fish, because they are stationary during actual processing. The quality of processing, in particular the cutting quality, is thus crucially improved.

Advantageously, in addition to the fish receptacle for the torso, a head support is provided. As a result, the fish is supported over its whole area throughout processing, leading to improved and simplified positioning of the fish. The improved positioning guarantees optimised and repeatable guiding of the cut with improved cutting results.

In a preferred development of the invention, the head support is of movable construction. This allows the processing of fish within an increased length range, preferably within a range from 35 to 90 cm, as the head support can yield, depending on the fish size.

A further advantageous embodiment comprises, in addition to the head support, a head clamp too. This clamp allows the head to have a precise position and be fixed at each processing position, leading to improved cutting quality. Further, due to separate clamping of the torso on the one hand and the head on the other hand, discharge of the respectively fixed part in different positions can be effected.

Particularly advantageous is the embodiment in which the slaughtering apparatus in addition to the curved slaughter knife includes a circular blade. This ensures that the abdominal cover is completely cut during the slaughter cut, independently of the fish size, so as to produce a central, straight cut which is required for example for the production of saltfish.

It is particularly advantageous that the curved slaughter knife is constructed in two portions and consists of a main portion and a tip portion. This guarantees in a particularly effective manner that external influences acting on the curved slaughter knife, e.g. acceleration due to wave motion on a ship, have no effect on the manner of operation or the result of operation, because guiding of the curved slaughter knife is effected by means of the main portion, while deflection of the curved slaughter knife is limited to the tip portion. For this purpose, at least the tip portion of the curved slaughter knife is spring-loaded and pivotable or deflectable about a pivot point. The extra degree of freedom of the curved slaughter knife therefore makes it insensitive to external disturbing influences. In other words, the moving mass which for example is subject to acceleration is greatly reduced.

The above-mentioned object is achieved in the method of the kind mentioned hereinbefore by the fact that the fish receiving drum rotates about a horizontal shaft, so that the fish are moved on an essentially vertical circular path, wherein the fish receiving drum moves intermittently. As a result, simplified handling is provided, as the fish receptacles are more readily accessible for laying the fish and the lifting work is greatly reduced. Furthermore, processing of the fish takes place in the stopped position of the fish receiving drum, so that more precise and therefore qualitatively improved processing is possible.

In an advantageous method, the head and the web between the collarbone tip and the connecting point of the gills are pushed down before the throat cut, so that the skin in the region of the collarbone tip is stretched. Due to stretching, firstly the throat cutting apparatus can cut through the skin more easily and cleanly. Secondly, the throat cutting apparatus with the circular blade is applied almost perpendicularly to the connecting web, guaranteeing reliable separation.

Further preferred embodiments and procedures are apparent from the subsidiary claims and the description. With the aid of the attached drawings, selected embodiments and procedures are described in detail.

DETAILED DESCRIPTION OF THE INVENTION

Figure 1:
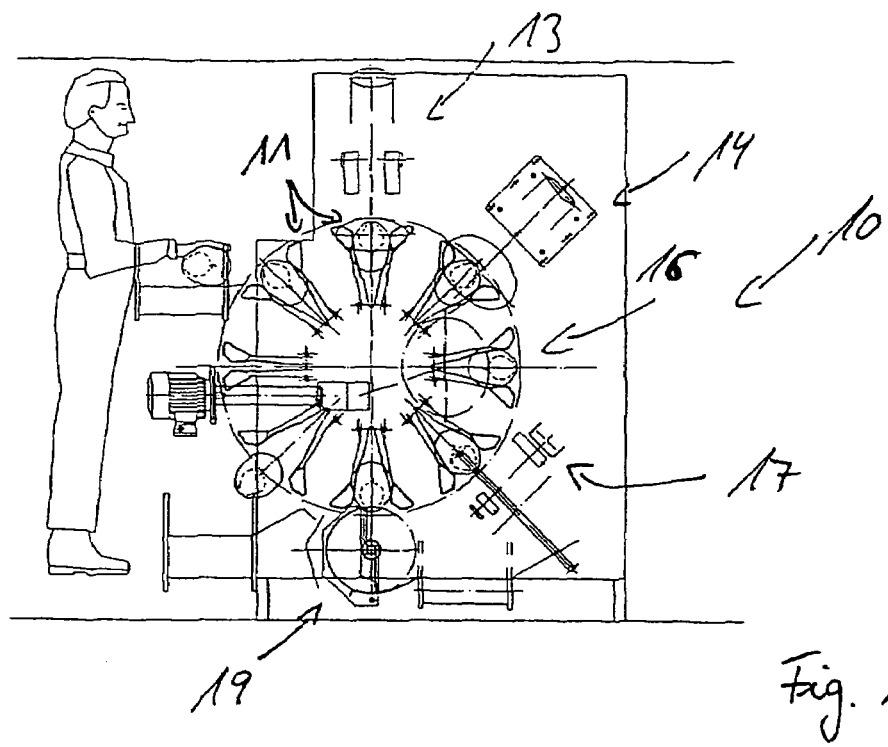
FIG. 1 a front view of a device according to the invention.
Figure 2:
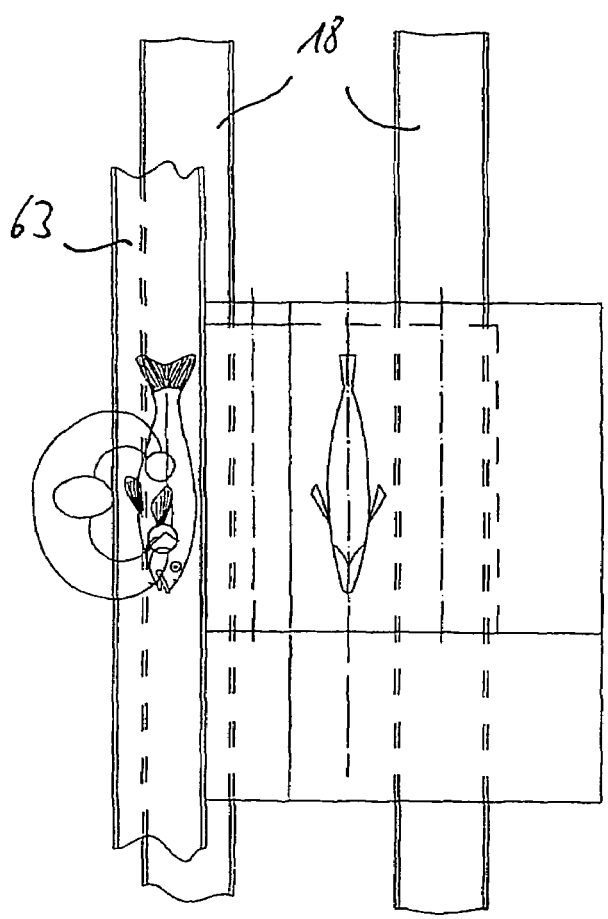
FIG. 2 a top view of a detail of the device as in FIG. 1.
Figure 3:
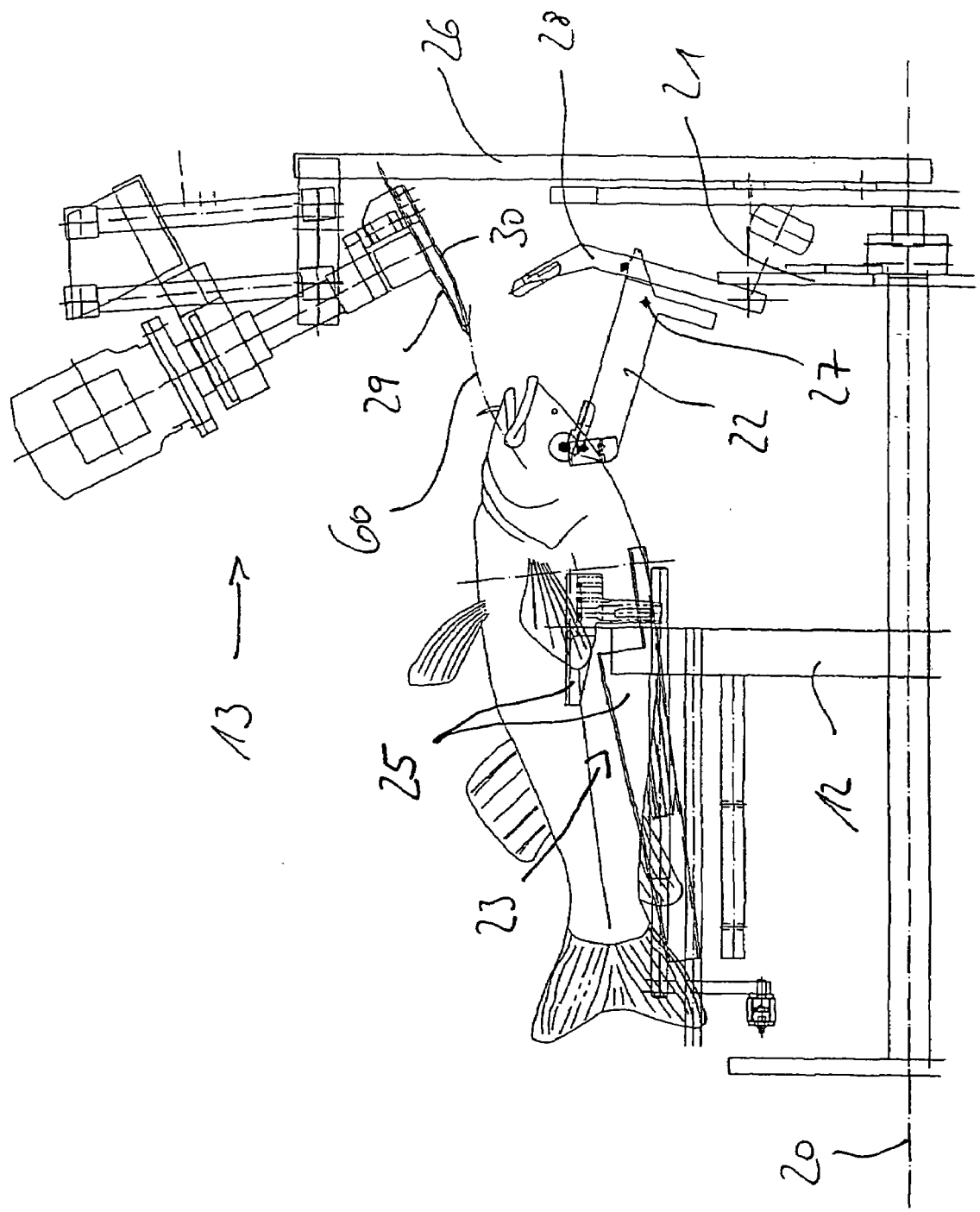
FIG. 3 a detail of the device, namely the throat cutting apparatus in its starting position before starting to cut a fish, in an enlarged view from the angle of the operator, FIG. 4 the throat cutting apparatus as in FIG. 3 in its processing position, the head of the fish being clamped, FIG. 5 a further detail of the device, namely the guide between the throat cutting apparatus and the pharynx cutting apparatus in an unloaded position, FIG. 6 the guide as in FIG. 5 in a loaded position, namely deflected upwards by the fish, FIG. 7 a further detail of the device, namely the pharynx cutting apparatus in its starting position before the pharynx cut, in an enlarged view from the angle of the operator, FIG. 8 the pharynx cutting apparatus as in FIG. 7 in its processing position, the head of the fish being clamped, FIG. 9 a further detail of the device, namely the heading apparatus in its processing position, in an enlarged view from the angle in the direction of the operator, FIG. 10 a further detail of the device, namely the slaughtering apparatus in a position shortly after entry into the open abdominal cavity, in an enlarged view from the angle as in FIG. 9, FIG. 11 the slaughtering apparatus as in FIG. 10 in the next processing position, FIG. 12 the slaughtering apparatus as in FIG. 10 in the next processing position, FIG. 13 the slaughtering apparatus as in FIG. 10 in the next processing position, FIG. 14 a further detail of the device, namely the gut severing apparatus, in an enlarged view from the angle as in FIG. 9, FIG. 15 the gut severing apparatus as in FIG. 14 in a front view, FIG. 16 details of a fish during the throat cutting operation in a side view, FIG. 17 a further embodiment of the slaughtering apparatus in a position shortly after entry into the open abdominal cavity, in an enlarged view from the angle as in FIG. 9, FIG. 18 the slaughtering apparatus as in FIG. 17 in the next processing position, FIG. 19 the slaughtering apparatus as in FIG. 17 in the next processing position, FIG. 20 the slaughtering apparatus as in FIG. 17 in the next processing position.
Figure 4:
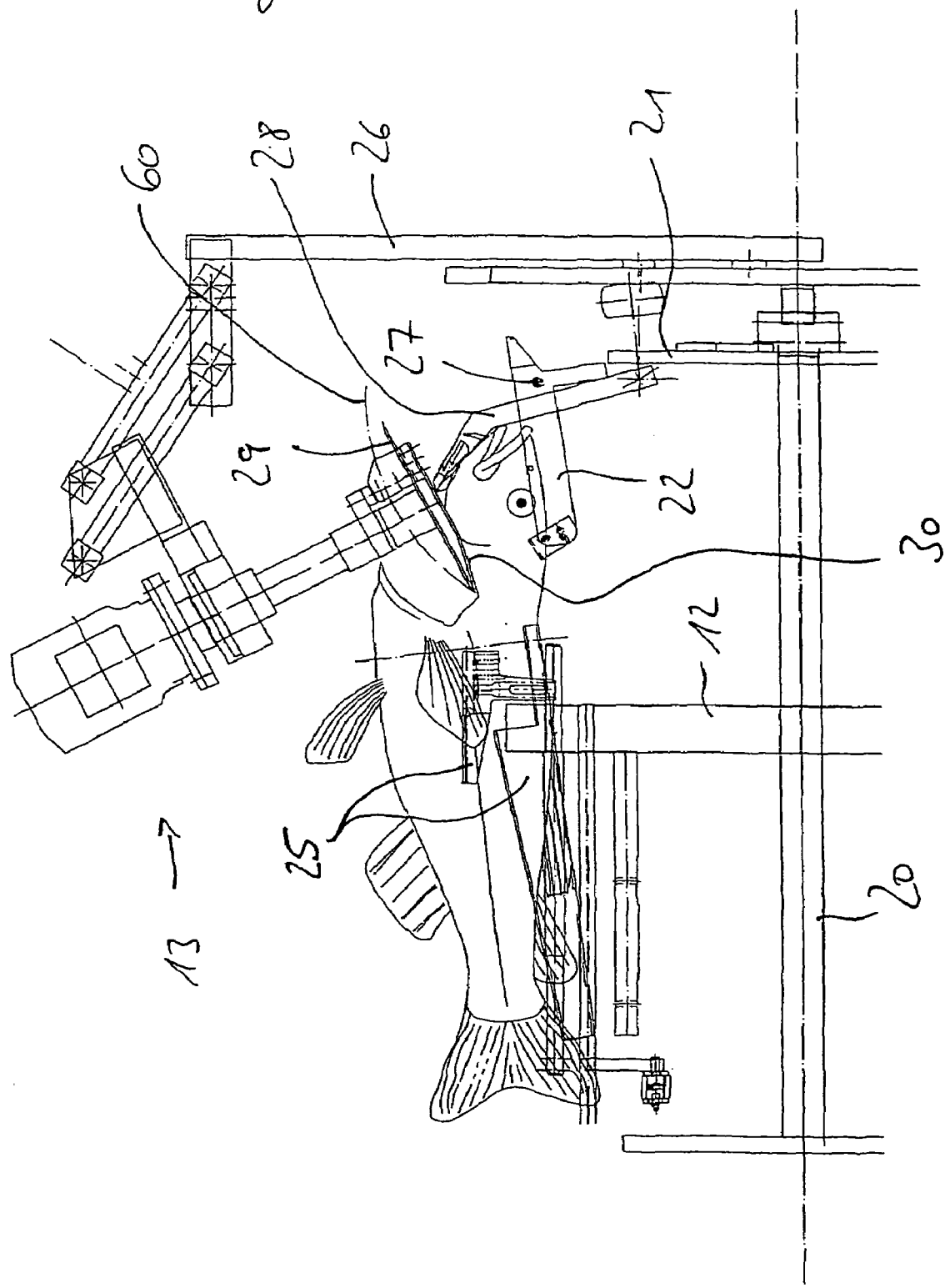
Figure 5:
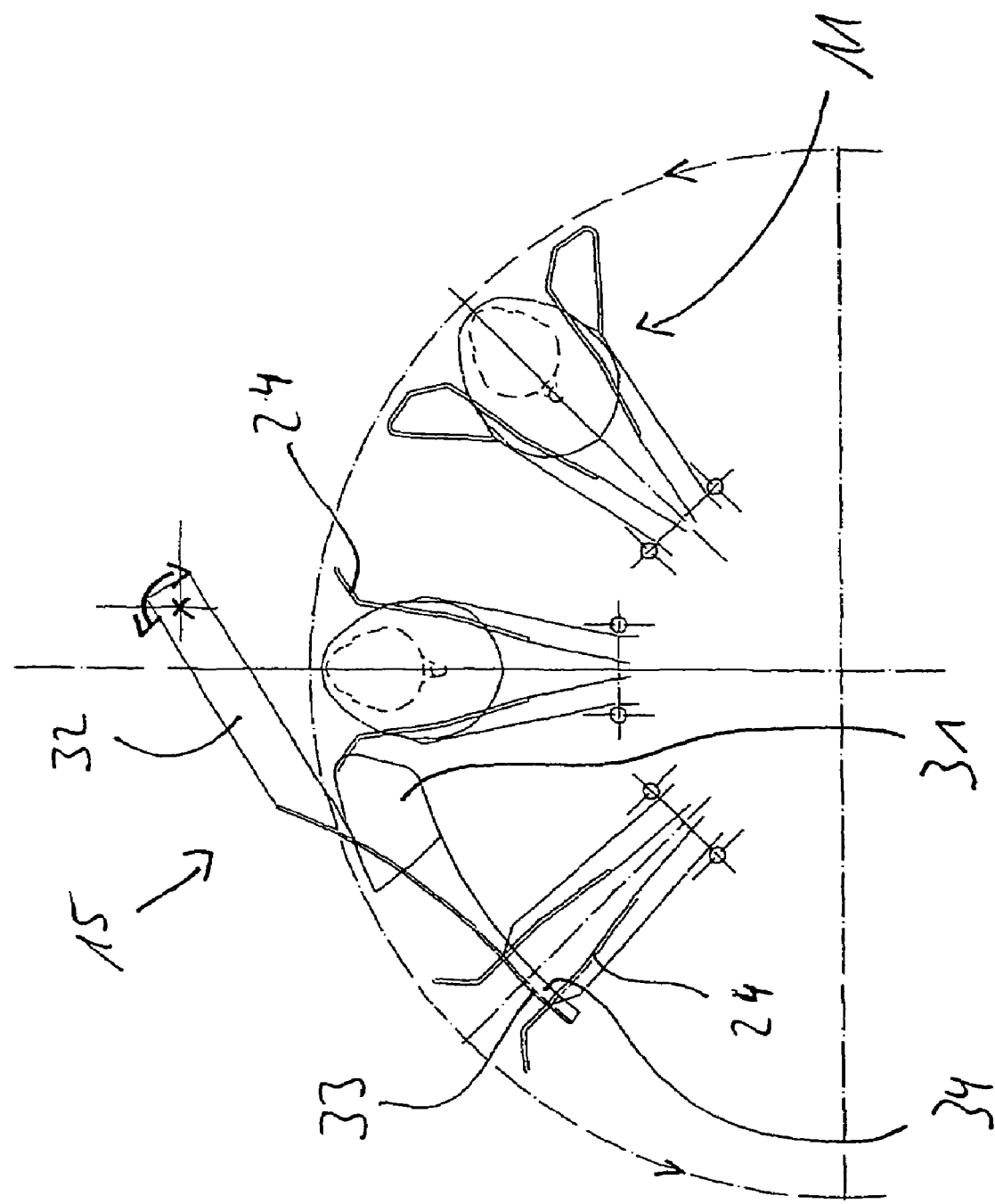
Figure 6:
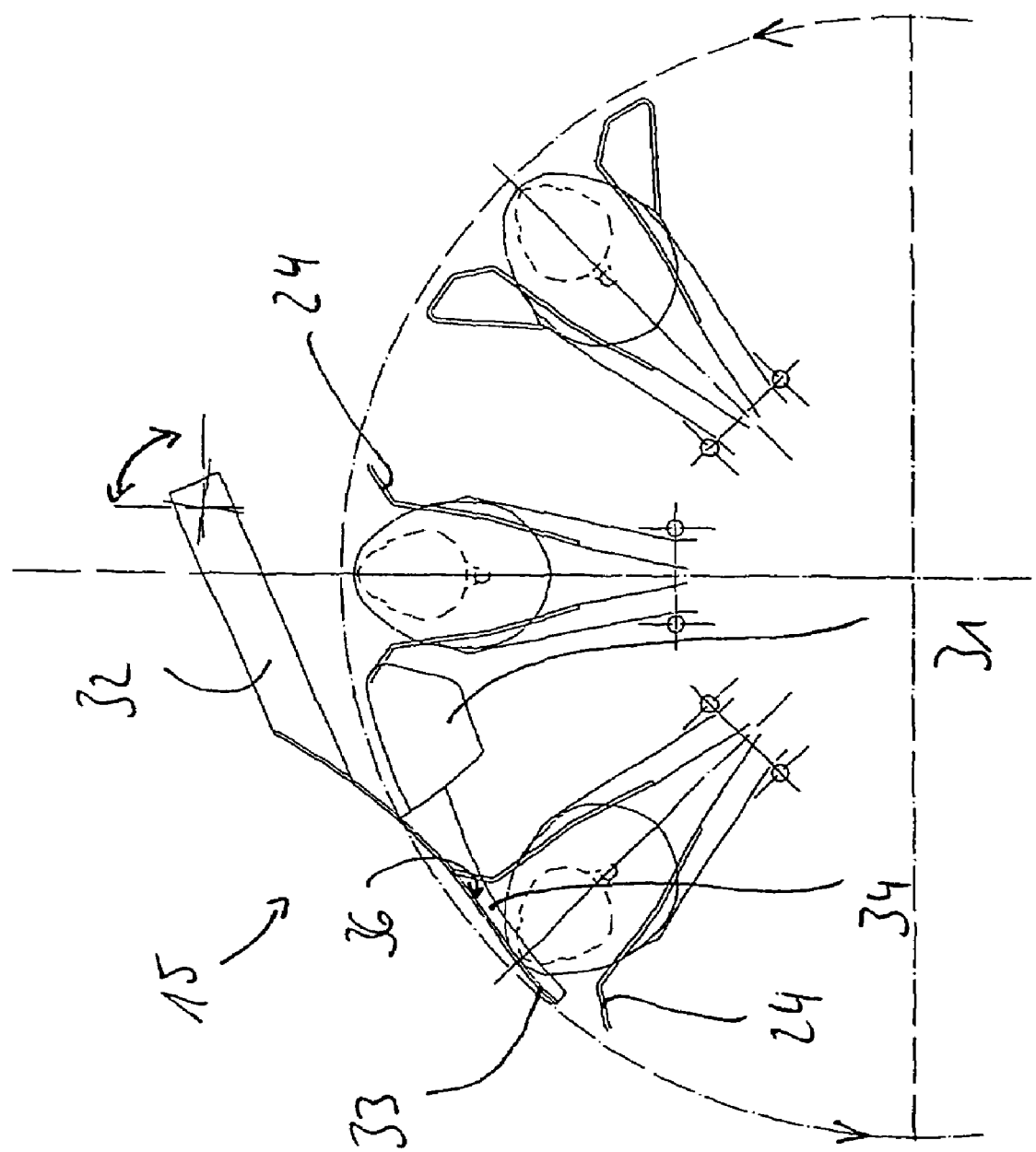
Figure 7:
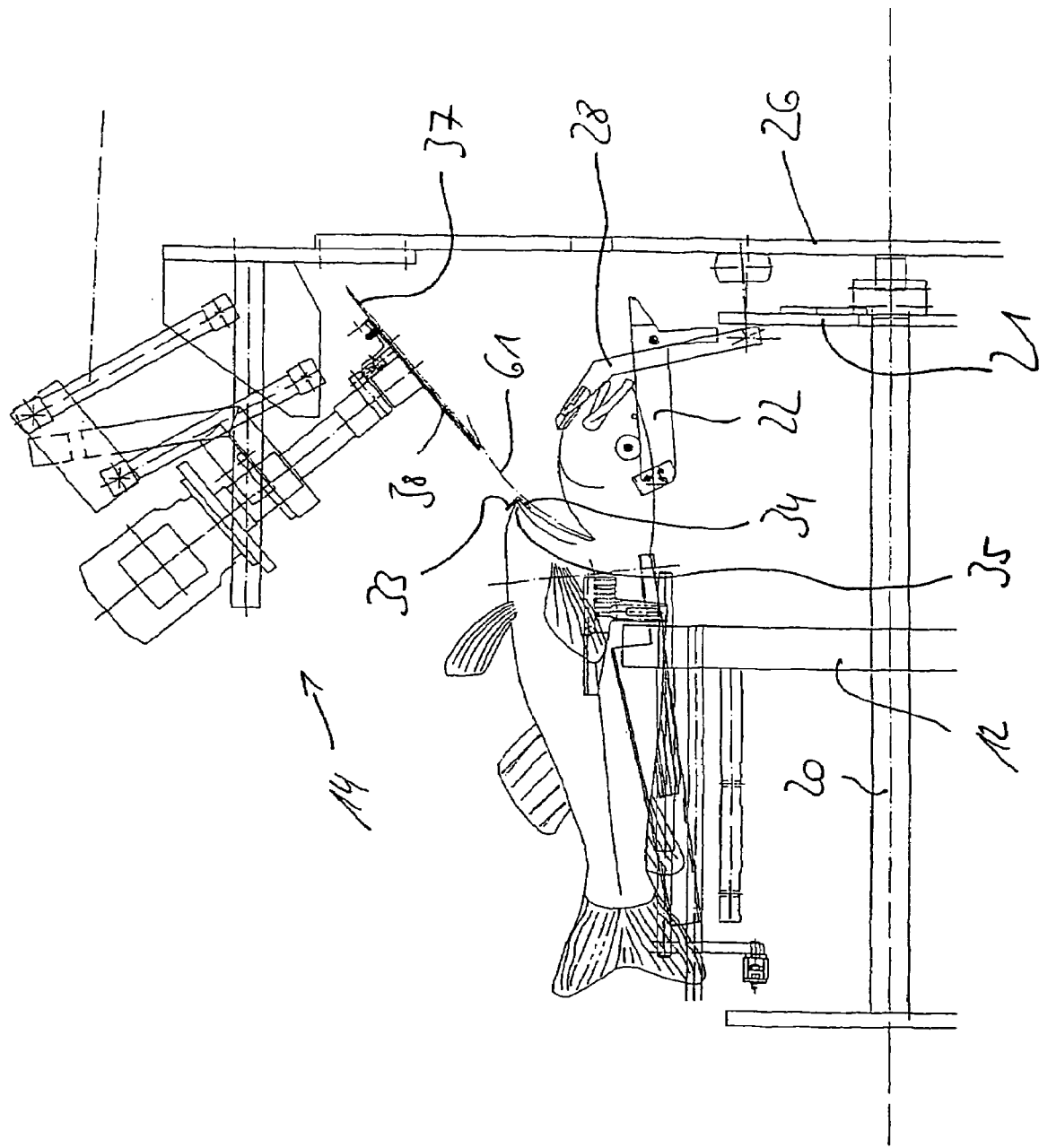
Figure 8:
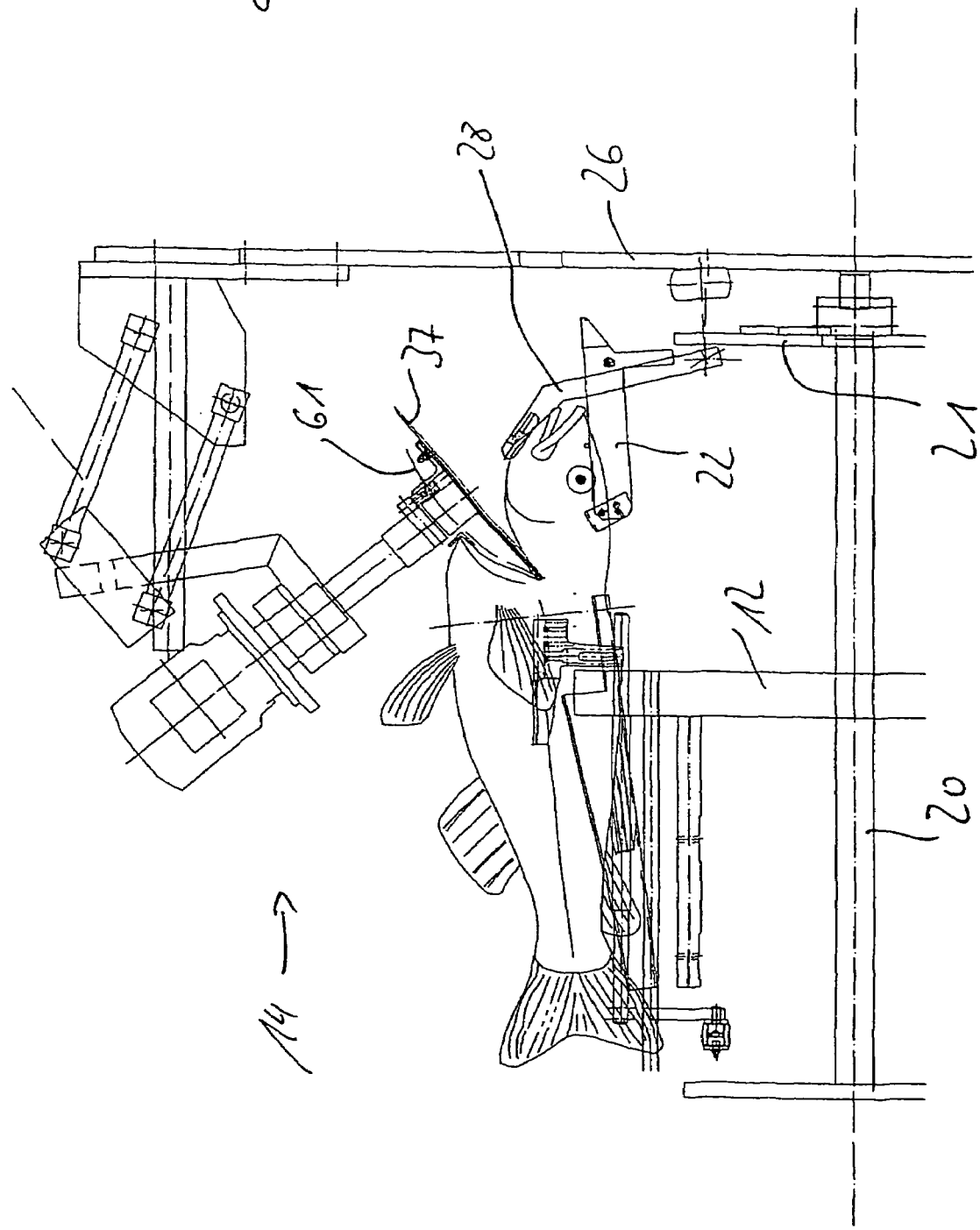
Figure 9:
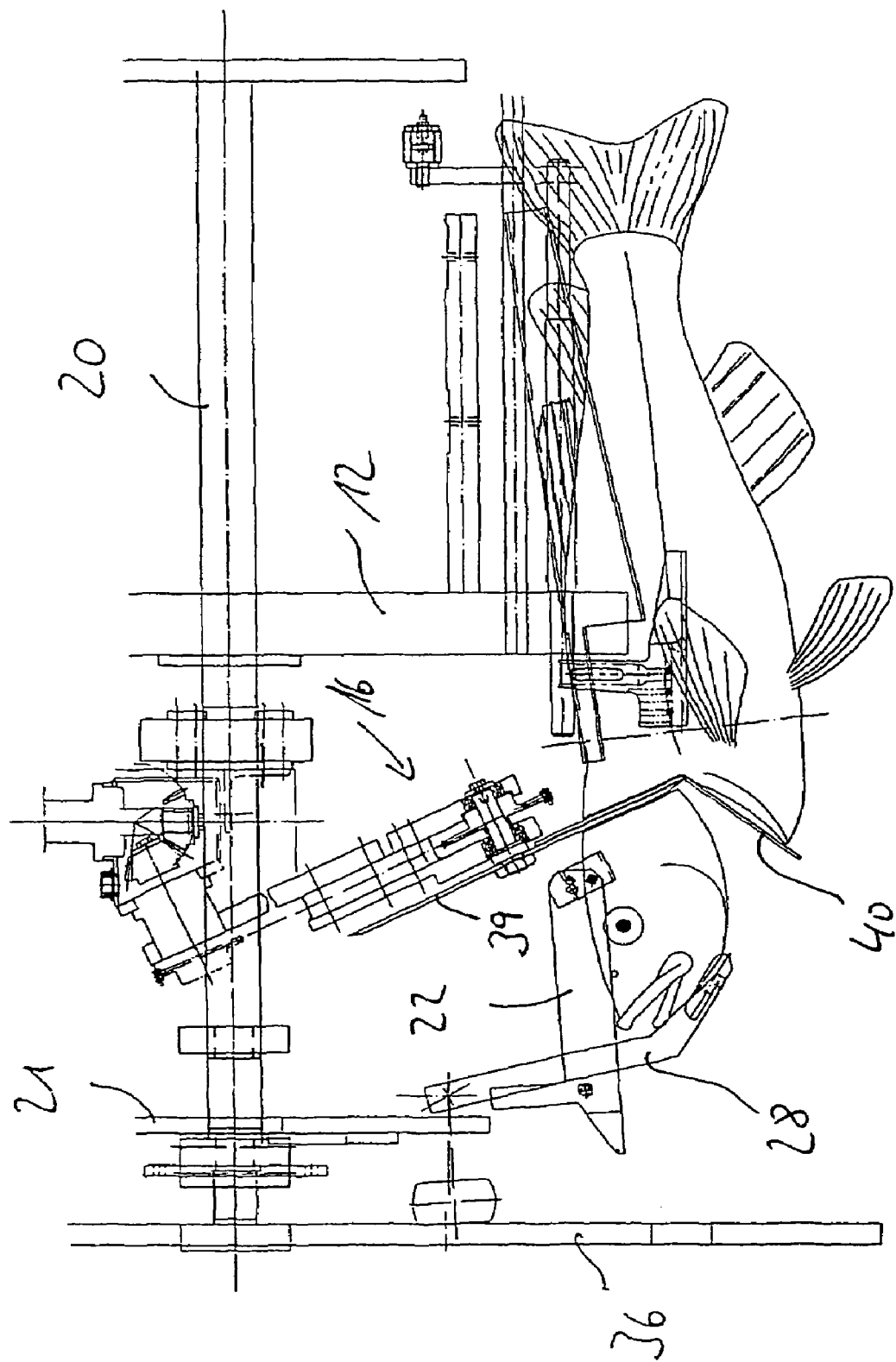
Figure 10:
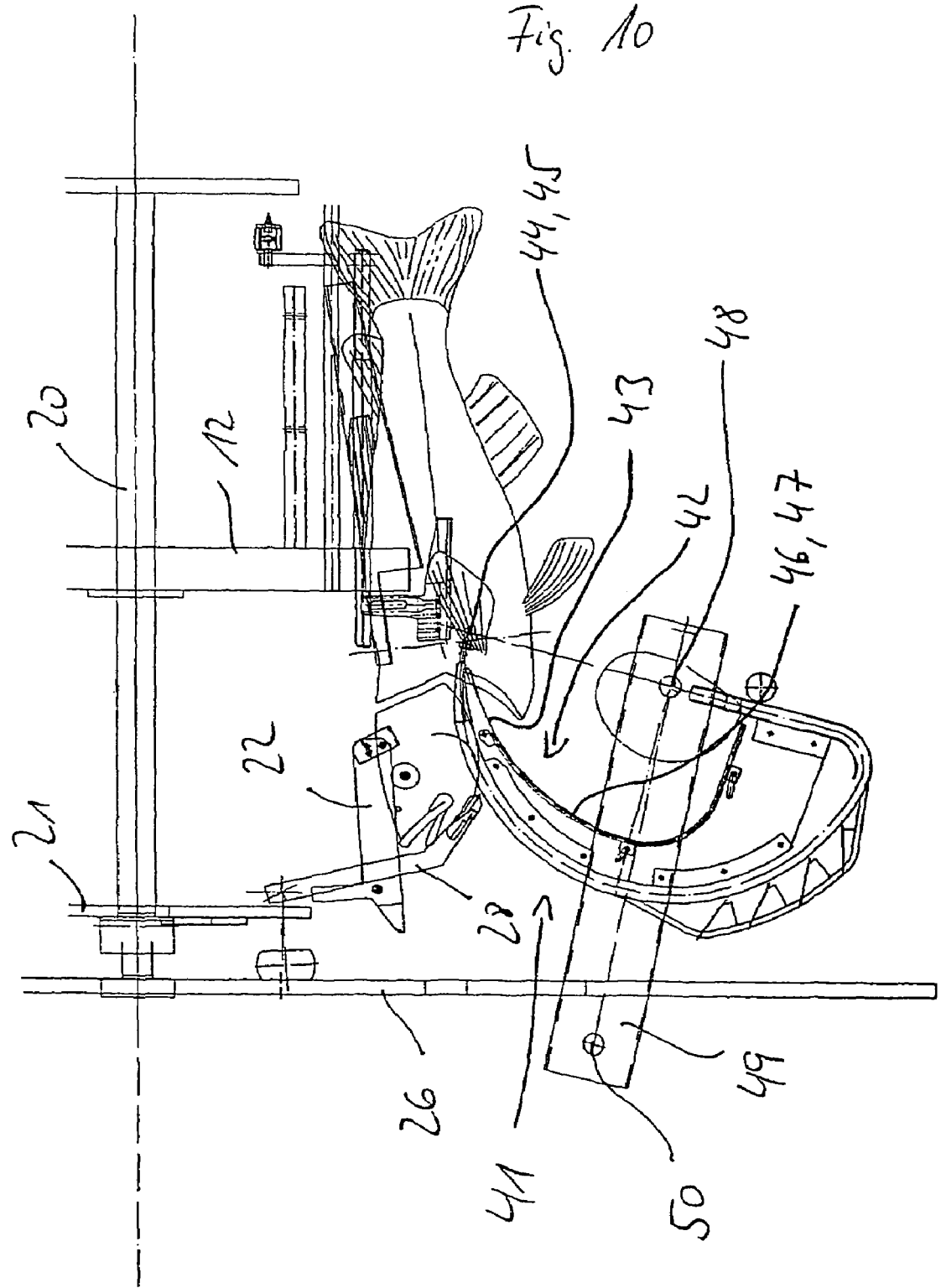
Figure 11:
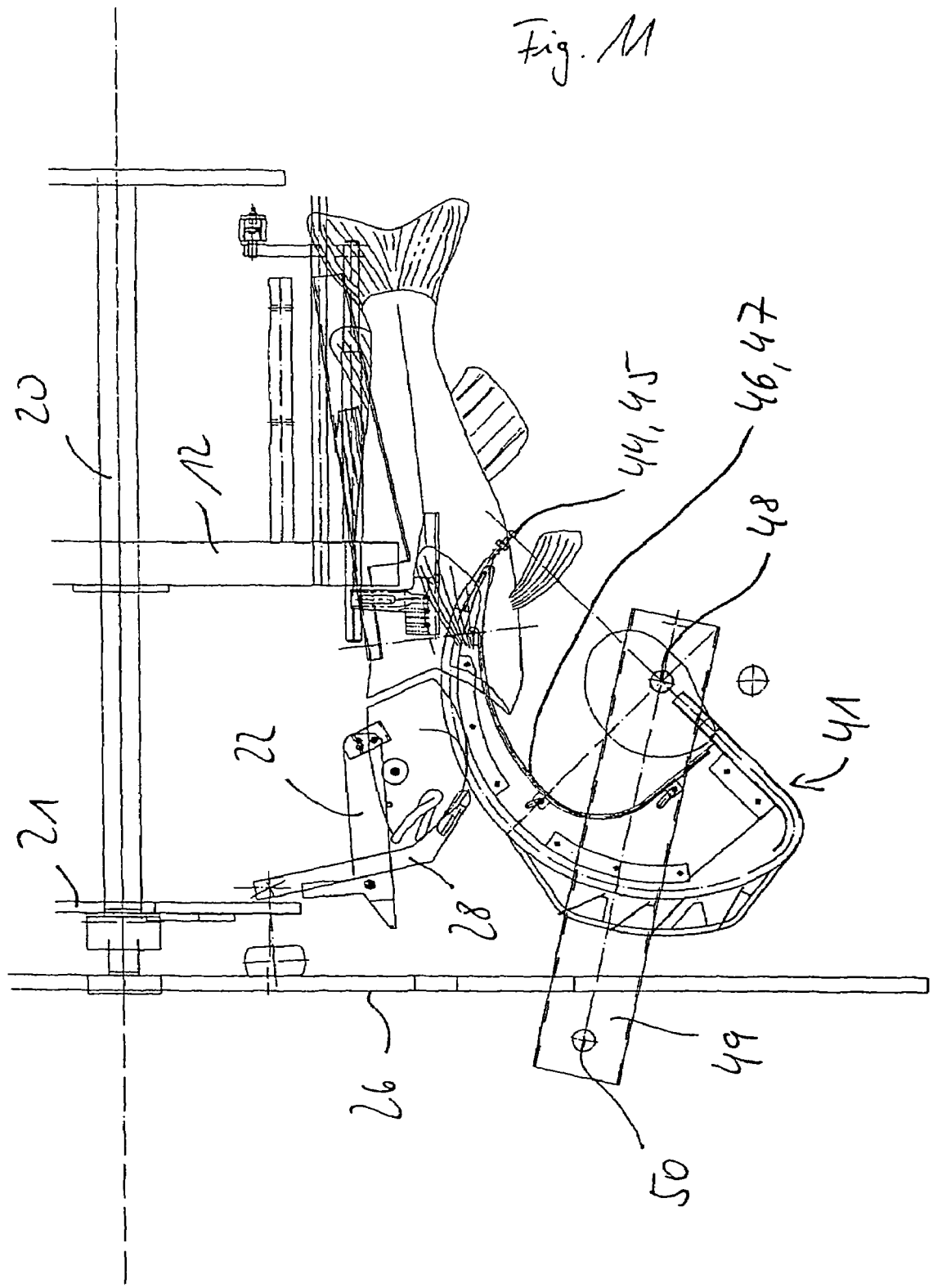
Figure 12:
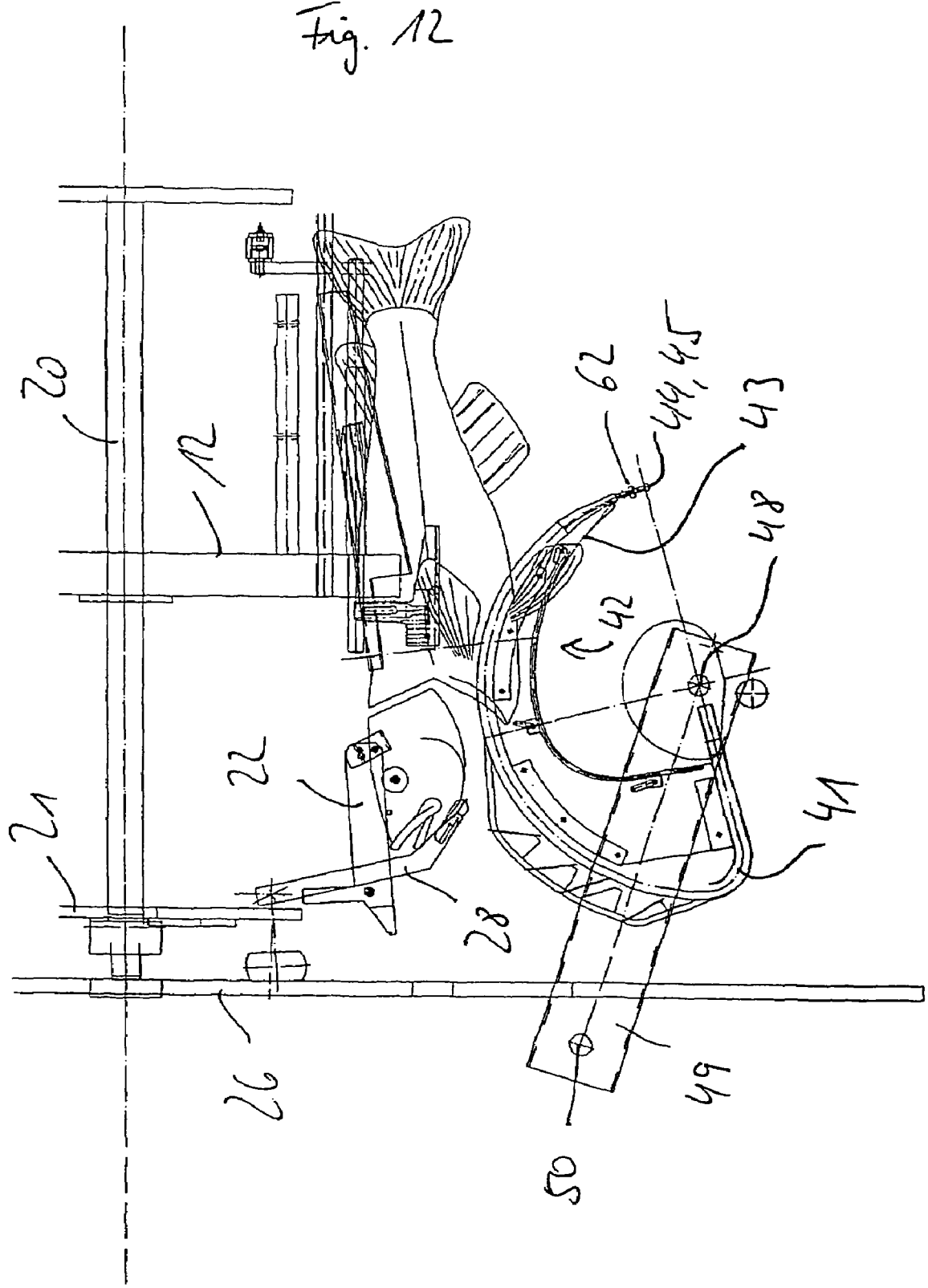
Figure 13:
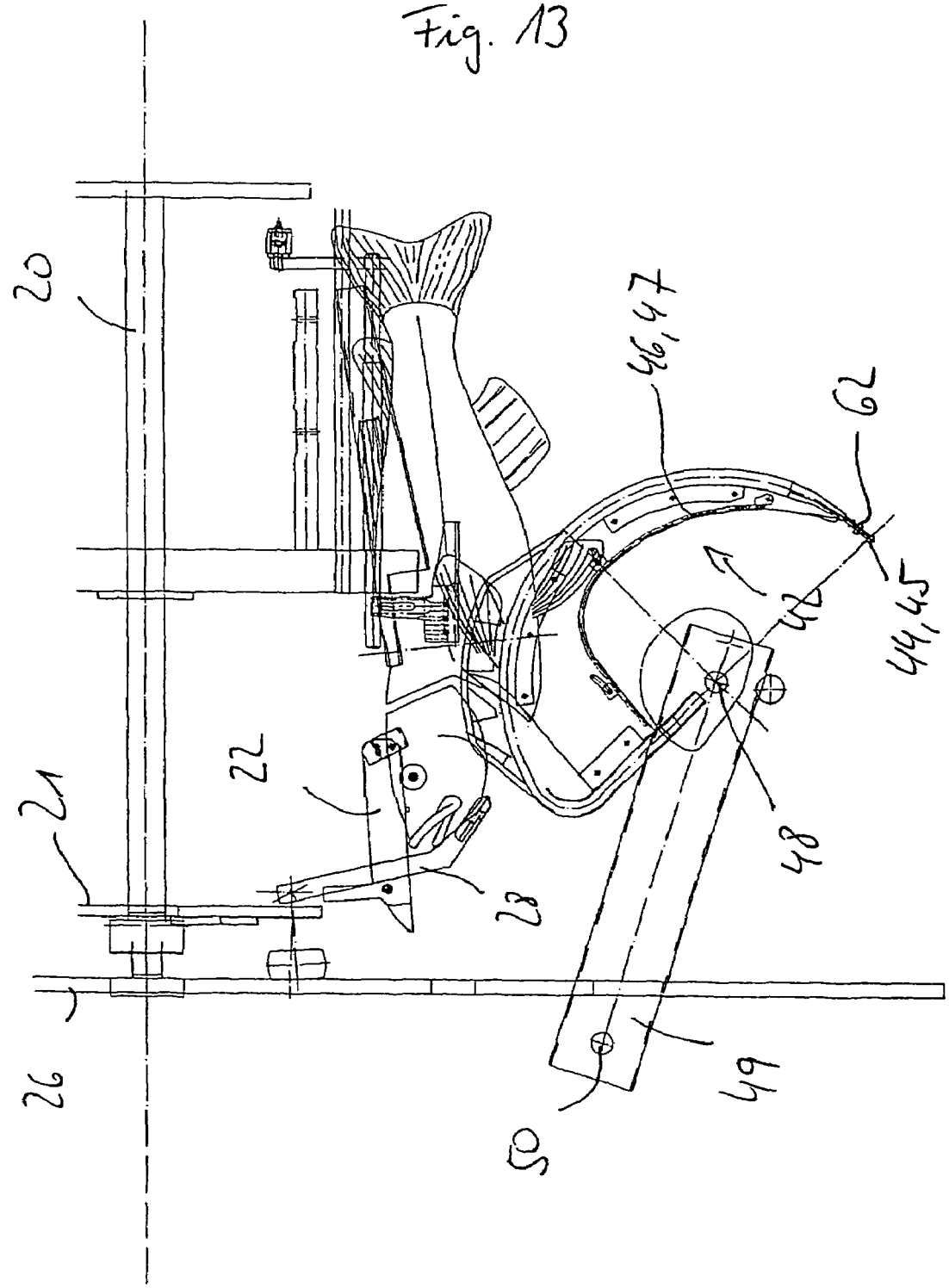
Figure 14:
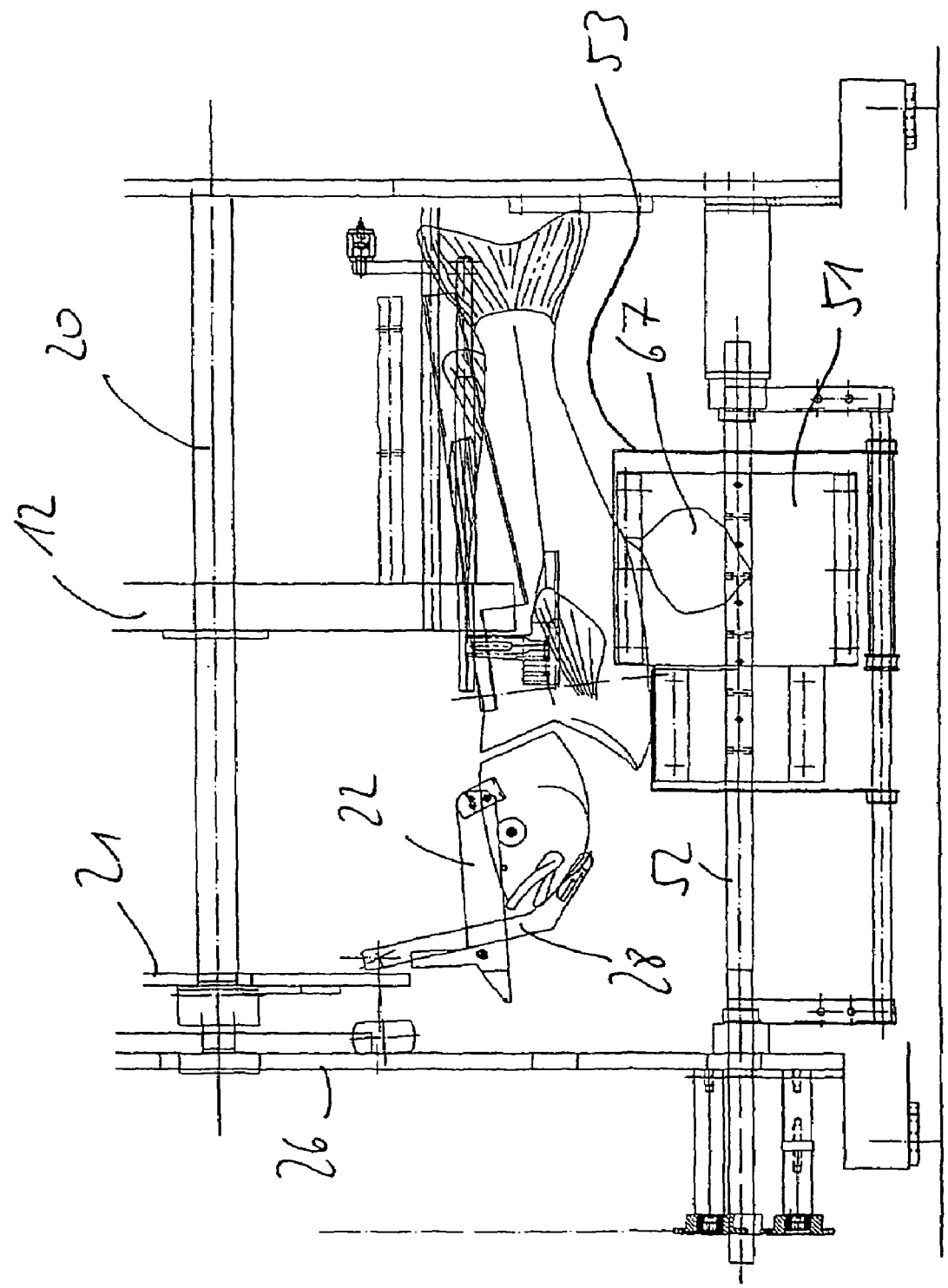
Figure 15:
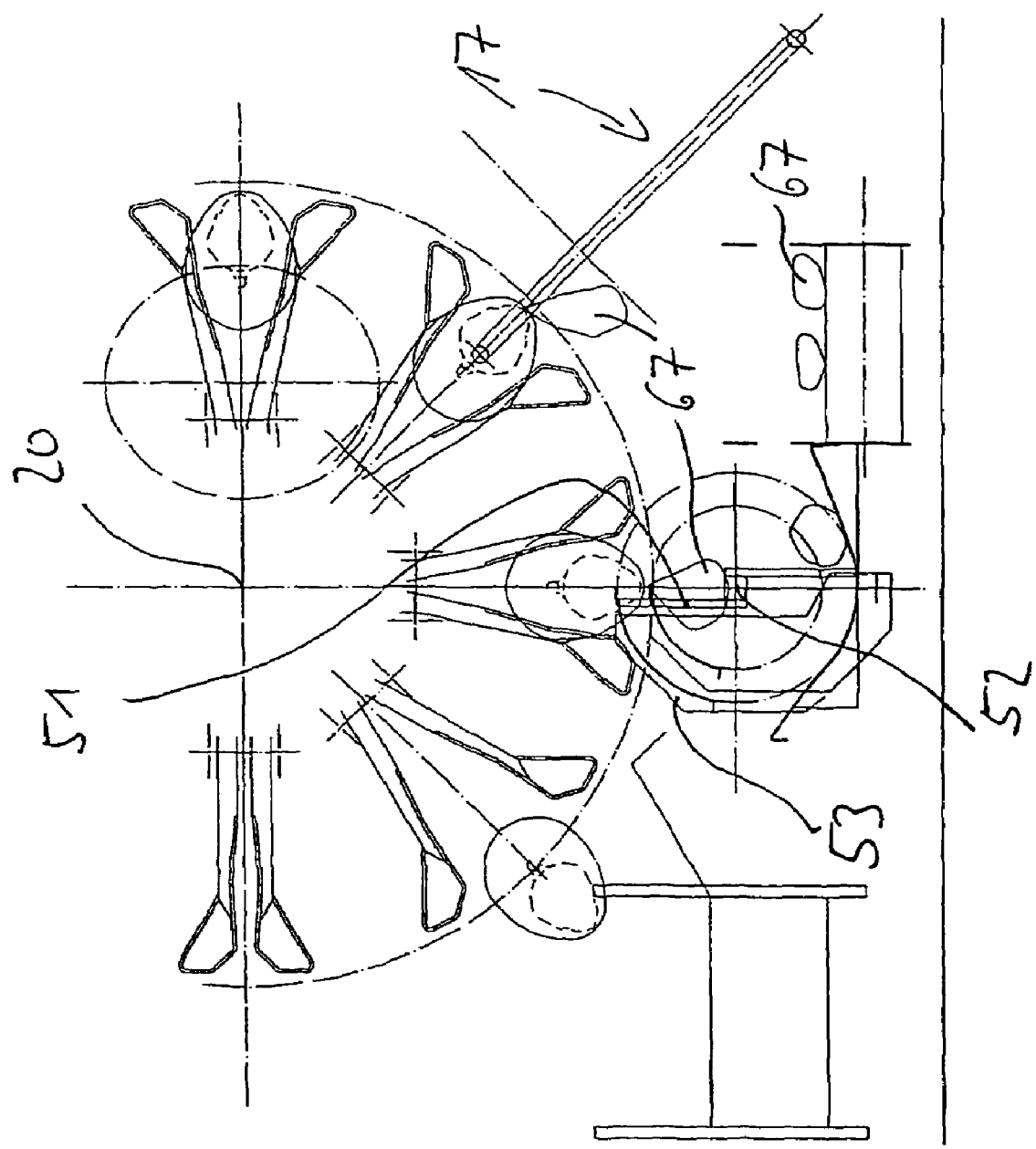

The device 10 described in FIGS. 1 to 15 or 17 to 20 is used for slaughtering fish, in particular white fish, this being preferably within a size range from 35 to 90 cm.

The device 10 includes several fish receptacles 11 for laying the fish in. The fish receptacles 11 are arranged in a circle and form a rotationally driven fish receiving drum 12. With the fish receiving drum 12, the fish are movable to the individual processing stations of the device 10. In the direction of transport of the fish receiving drum 12, after a station for laying the fish in the fish receptacle 11 in the region of a product delivery means is located a throat cutting apparatus 13 for cutting through the throat in preparation for the pharynx cut. The throat cutting apparatus 13 is followed by a pharynx cutting apparatus 14 for cutting through the pharynx. Between the throat cutting apparatus 13 and the pharynx cutting apparatus 14 are provided guides 15 (see in particular FIGS. 5 and 6). In the practical example shown, behind the pharynx cutting apparatus 14 is provided a heading apparatus 16 for severing the head from the torso. The heading apparatus 16 can however also be switched off or dismounted, so that slaughtering and/or heading can be carried out with the device 10. Adjoining the heading apparatus 16 is a slaughtering apparatus 17 for opening the abdominal cavity. As the last work station before discharge of the fish to a product removal device 18 there is provided a gut severing apparatus 19 for completely releasing the entrails from the abdominal cavity.

In the practical example as in FIG. 1, eight fish receptacles 11 are evenly distributed over a circular path of the fish receiving drum 12. The fish receiving drum 12 is rotatable about a horizontal shaft 20, in such a way that fish are movable on an essentially vertical circular path. A second drum 21 is likewise arranged on the shaft 20, but at a distance from the fish receiving drum 12. On the drum 21 are arranged head supports 22, in each case corresponding to a fish receptacle 11, so that in the preferred embodiment eight head supports 22 are provided also. Due to the arrangement both of the fish receiving drum 12 and of the drum 21 on the same shaft 20, the drums 12 and 21 rotate synchronously. The fish receiving drum 12—and hence also the drum 21—is driven intermittently. This guarantees that stopping is achieved at precise positions, preferably in the region of the individual work stations.

Each fish receptacle 11 comprises a locking element 23 which consists of a pectoral fin receptacle 24 and a torso clamp 25. The pectoral fin receptacle 24 is provided in pairs, namely on both sides of a fish to be laid, and comprises means with which the fish can be pre-positioned in the longitudinal direction in the fish receptacle 11. Corresponding to the fish receptacles 11 are mounted the head supports 22 in the direction of the processing stations, which are arranged on a fixed tool stand 26. The head supports 22 are pivotable about a pivot point 27, such that the head supports 22 can be moved downwards out of an upper stop position. Alternatively it is also conceivable for movement of the head supports 22 to take place on a linear path. Furthermore, the head supports 22 are spring-loaded so as to be spring-yielding, so that they are movable out of the downwardly deflected position back to the upper starting position, namely against a stop. Each head support 22 is assigned a head clamp 28 which clamps the head in sandwich fashion between itself and the head support 22. The head clamp 28 is cam-controlled in the practical example shown. Other control means are possible too, however. The exact manner of operation of the head clamp 28 is described in more detail below within the scope of the description of the method.

The torso clamp 25 essentially consists of a three-jaw chuck, namely two side jaws laterally engaging the fish and one back support. By rotation of the fish receiving drum 12 in the direction of the throat cutting apparatus 13, the side jaws move towards each other and clamp the fish. The back support is positively controlled by the side jaws so as to rise when the side jaws are pressed together. Preferably, the side jaws on their inner sides facing towards the fish have holding elements or the like, which serve to hold the fish reliably in the fish receptacle 11.

The throat cutting apparatus 13 includes a circular blade 29 and a blade cover 30 corresponding to the circular blade 29. The whole throat cutting apparatus 13 is movable on a circular path 60. This circular path 60 has been determined experimentally, such that the circular path 60 constitutes an optimised path for different fish sizes. The pivot movement of the throat cutting apparatus 13 is carried out by a parallelogram in the preferred embodiment. However, other common pivot and drive means can be used as well. The throat cutting apparatus 13 is permanently mounted on the tool stand 26. In its rest position, the throat cutting apparatus 13 is located outside the transport and working range of the fish. By suitable control means, the throat cutting apparatus 13 is movable into the circular path of the fish receiving drum 12. The blade cover 30 is arranged below the circular blade 29, that is, on the side facing towards the fish. In the cutting position the blade cover 30 and the circular blade 29 are arranged at an acute angle to the shaft 20, and hence to the fish.

The guides 15 arranged between the throat cutting apparatus 13 and the pharynx cutting apparatus 14 for guiding and/or deflecting the collarbones before reaching the pharynx cutting apparatus 14 are constructed in at least two portions and consist of a fixed or rigid element 31 and a movable element 32. The rigid element 31 is formed from a single metal sheet and serves for engagement in the previously made throat cut. The element 31 is arranged so low as to abut directly against the collarbone of the fish, wherein the smallest fish to be processed is taken as the starting point in positioning of the element 31. Seamlessly adjoining the rigid element 31 is the movable element 32, so that continuous guiding of the fish is guaranteed. The movable element 32 is L-shaped, wherein one arm 33 rests on the fish on the abdominal side and another arm 34 covers the collarbone tip 35. The collarbone tip 35 is accordingly held in the groove 36 formed by the arms 33, 34. The arm 34 is only 15 to 20 mm long in the practical example shown. Other lengths are possible as well. It must only be ensured that the arm 34 does not cover the abdominal space, so that the pharynx cutting blade is movable into the desired position. The length of the arm 34 is accordingly again determined by the smallest fish to be processed. The movable element 32 is pivotable about a pivot point and spring-loaded, so that it is movable upwards by the collarbones.

The pharynx cutting apparatus 14 includes a circular blade 37 and a blade cover 38 designed to correspond to the circular blade 27. The pharynx cutting apparatus 14 is likewise attached to the tool stand 26 and movable again on an experimentally determined circular path 61, this being from a rest position to a working position. With the pharynx cutting apparatus 14, the same pressure can be applied to the collarbones as before by the flexible elements 32, this being by means of the blade cover 38. This ensures that the collarbones are kept out of the cutting region, so that they remain undamaged.

The heading apparatus 16 is attached to the tool stand 26. The heading apparatus 16 itself is mounted stationarily and has a rotationally drivable circular blade 39. Associated with the circular blade 39 is a corresponding blade cover 40 which engages in the pharynx cut. This ensures separation between head and torso of the fish.

The heading apparatus 16 is followed in the direction of transport by the slaughtering apparatus 17 which includes a curved slaughter knife 41. The curved slaughter knife 41 comprises on its inner side 42 a cutting edge 43 which extends into the region of the knife tip 44. However, the region of the knife tip 44 itself is of blunt construction. In the practical example shown, the knife tip 44 is provided with a ball 45. Other blunt designs of the knife tip 44 are conceivable too, however. The cutting edge 43 is provided with a blade cover 46, 47 on both sides, the blade covers 46, 47 being spring-loaded. In the starting position, that is, in the unloaded state, the blade covers 46, 47 conceal the cutting edge 43. By pressure on the blade covers 46, 47, for example by the abdominal skin of the fish, the blade covers 46, 47 are movable upwards, so that the cutting edge 43 protrudes from the blade covers 46, 47. In one embodiment, not shown, the curved slaughter knife 41 comprises on its outer sides so-called reamers. The reamers are comb-like and guarantee that the entrails 67 are completely released from the abdominal cavity, for example, when the entrails 67 are still joined to the fish due to being grown over, so that they are only joined to the fish torso by the gut in the region of the anus.

The curved slaughter knife 41 is of movable construction and arranged to be rotatable about a pivot point 48. Further, the curved slaughter knife 41 is spring-loaded. The pivot point 48 of the curved slaughter knife 41 is located in the region of a link 49 which is also designed to be pivotable about a pivot point 50. This ensures a superimposed movement of the curved slaughter knife 41, namely a movement on a circular path and/or a linear movement, as the whole link 49 is lifted or pivots about the pivot point 50 as soon as the curved slaughter knife 41 is prevented from performing the rotational movement by a resistance. This then leads to a linear movement of the knife tip 44.

In a further embodiment of the curved slaughter knife 41, in the region of the knife tip 44, namely behind the ball 45, is provided a cutting means 62 with which the connection between the gut and the anus can be broken. For this purpose the cutting means 62 is of circular construction, after the fashion of a cup drill, a round bar or the like, the cutting means 62 or the cutting plane being essentially perpendicular to the curved slaughter knife 41.

A further embodiment of the slaughtering apparatus 17 is described below with the aid of FIGS. 17 to 20.

The slaughtering apparatus 17 in this embodiment essentially consists of a curved slaughter knife 70 and a circular blade 71. The curved slaughter knife 70 comprises on its inner side 72 a cutting edge 73 which extends almost into the region of the knife tip 74. However, the region of the knife tip 74 itself is of blunt construction. The cutting edge 73 is provided with a spring-loaded blade cover 75 on both sides.

The curved slaughter knife 70 is constructed in two portions and comprises a first so-called fixed main portion 76 and a movable tip portion 77. The tip portion 77 is pivotable about a pivot point 78, so that the radius formed by the cutting edge 73 can, as it were, "open" under load. The curved slaughter knife 70 as a whole is of movable construction and arranged to be rotatable or pivotable about a pivot point 79. The pivot point 79 is located in the region of a link 80 which is designed to be pivotable about a pivot point 81 likewise. The link 80 is basically held in a lower position by a spring 82 (see e.g. FIG. 17), wherein the spring force with reference to the pivot point 81 acts clockwise on the link 80.

On the shaft 83 on which the curved slaughter knife 70 is arranged are also located a cam plate 84 and a swivel arm 85. Due to the arrangement on the same shaft 83, the curved slaughter knife 70, the cam plate 84 and the swivel arm 85 run synchronously in a precise position relative to each other about the pivot point 79. At the free end of the swivel arm 85 is arranged the circular blade 71 which is rotationally drivable by drive means, not shown. The swivel arm 85 or the circular blade 71 are arranged in relation to the curved slaughter knife 70 in such a way that the circular blade 71 is more or less located in the region of the main portion 76 of the curved slaughter knife 70. The cam plate 84 runs on a roller 86 which is arranged stationarily, for example on the machine frame. The shape of the cam plate is adapted to the smallest fish to be processed and can be changed as required. The cam plate 84 on the one hand and the roller 86 on the other hand always have contact with each other, at least while the curved slaughter knife 70 is located inside the fish torso. This contact, which on the one hand guarantees precision guiding of the curved slaughter knife 70 and on the other hand brings stability to the whole slaughtering apparatus 17, is accomplished by the spring 82 which by means of the spring force constantly endeavours to pull the link 80 and hence also the cam plate 84 downwards onto the roller 86. In case of deflection of the curved slaughter knife 70, for example when the curved slaughter knife comes across a resistance in the form of the abdominal cover, only the tip portion 77 is pivoted about the pivot point 78, while the main portion 76 continues to be guided along the cam plate 84. The extra degree of freedom of the curved slaughter knife 70 is therefore fixed to a precise range, so that the freely moving mass is very small and hence insensitive to external disturbing influences.

The movable tip portion 77 of the curved slaughter knife 70 comprises a lever arm 87 which is connected to the main portion 76 by means of a spring 89. By means of the spring 89, the tip portion 77 is basically kept in the position shown in FIG. 17 via the lever arm 87. In this position, the cutting edge 73 roughly describes a radius. When the knife tip 74 is loaded anti-clockwise (in relation to the pivot point 78), the spring is extended, while the radius "opens". As soon as the load subsides, the spring 89 endeavours to pull the tip portion 77 back into its original position. A further spring 88 is mounted between the lever arm 87 and the blade cover 75 in a so-called "closed" system. The spring 88 causes the blade cover 75 upon deflection of the tip portion 77 to run synchronously, that is, parallel thereto, or to move with it. Only when a load acts on the blade cover 75, e.g. at the beginning of the slaughter cut, is the spring 88 stretched. As soon as the load subsides, the spring 88 pulls the blade cover 75 back in front of the cutting edge 73.

The curved slaughter knife 70 can, like the curved slaughter knife 41, be provided in the region of the knife tip 74 with an additional cutting means 90 for severing the connection between gut and anus. Also, the blunt knife tip 74 can be designed with a ball 91 or other blunt constructions.

In the lowermost position of the fish receiving drum 12 are arranged means for removing the entrails, namely the gut severing apparatus 19. The gut severing apparatus 19 includes rotatable flaps, namely so-called paddles 51. In the practical example shown, two paddles 51 are in each case offset from each other by 180° and rotatable about a shaft 52. However, any other number of paddles 51 which are evenly distributed about the shaft 52 is conceivable. In addition, a support 53 is provided such that the entrails can be clamped between one of the paddles 51 and the support 53. The support 53 is magnet- and spring-loaded. By means of the spring and/or magnetic force, the clamping force between the paddles 51 on the one hand and the support 53 on the other hand is adjustable.

Below, the manner of operation or the procedural cycle of fish slaughter with the device described is explained.

The fish are conveyed on a product delivery means 63 into the region of the device 10. An operator removes the fish individually from the product delivery means 63 and lays each fish individually in the fish receptacle 11 of the fish receiving drum 12 provided for it. The fish receptacle 11 in the laying position faces with its laying opening essentially in the direction of the operator. The fish is laid, seen from the operator, back first, head to the right, in the stationary and open fish receptacle 11 of the fish receiving drum 12.

During laying, the fish is pressed with the laterally projecting pectoral fins 64 in the tail direction against stops, the so-called pectoral fin receptacles 24, so that the fish is positioned in its longitudinal direction. During laying of the fish, the torso clamp 25 is opened to the maximum. This means that the side jaws on the one hand and the back support on the other hand are in their furthest position respectively. Thus the fish is held only by the pectoral fin receptacles 24, and at the same time the head of the fish rests loosely without further clamping on the head support 22.

During travel of the fish receiving drum 12 into the throat cutting position in which the fish is oriented with its belly almost vertically upwards, the side jaws of the torso clamp 25 move towards each other. Due to the movement of the side jaws, the back support is positively lifted. Due to this synchronised movement of the side jaws on the one hand and of the back support on the other hand, the middle bone of the fish is located roughly at the same height, regardless of the fish size. The side jaws move towards each other until the fish is firmly clamped.

Figure 16:
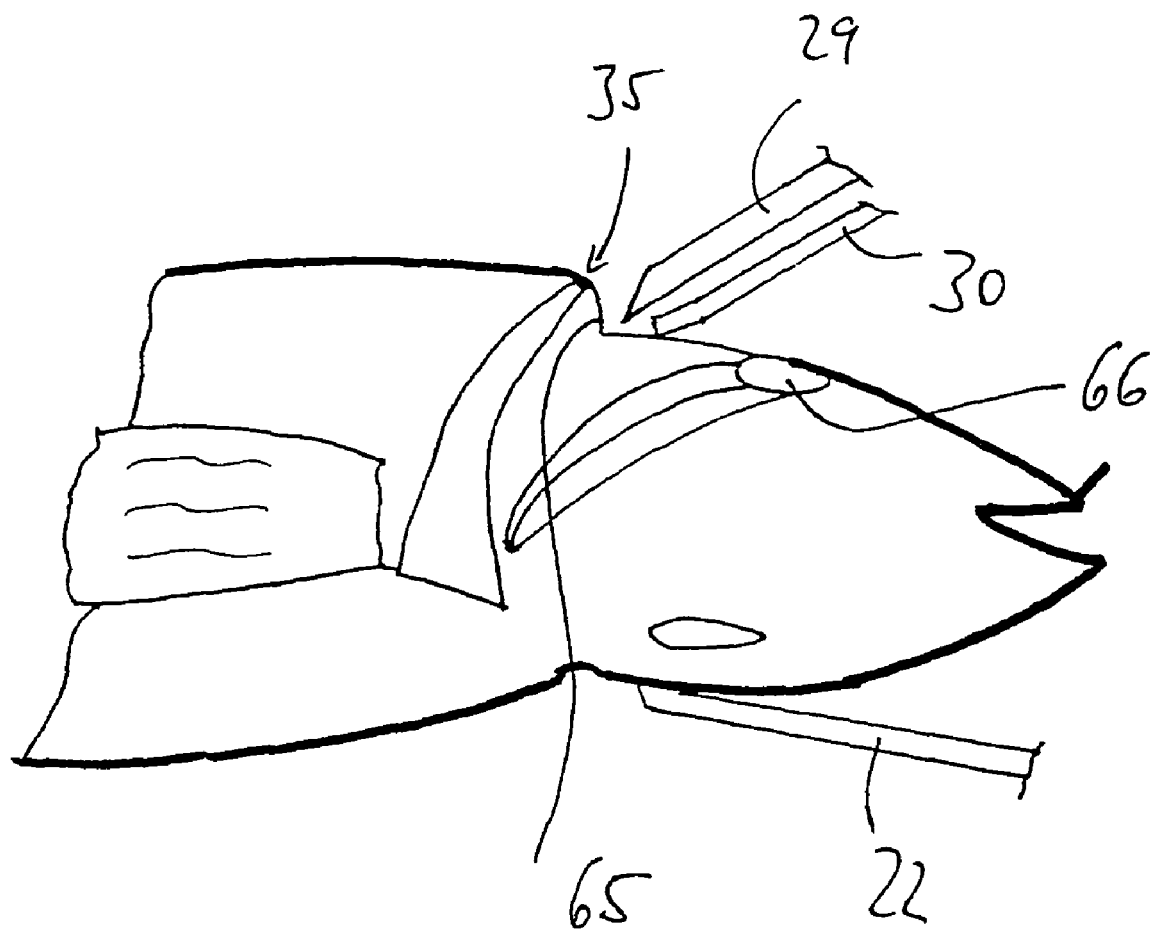
Figure 17:
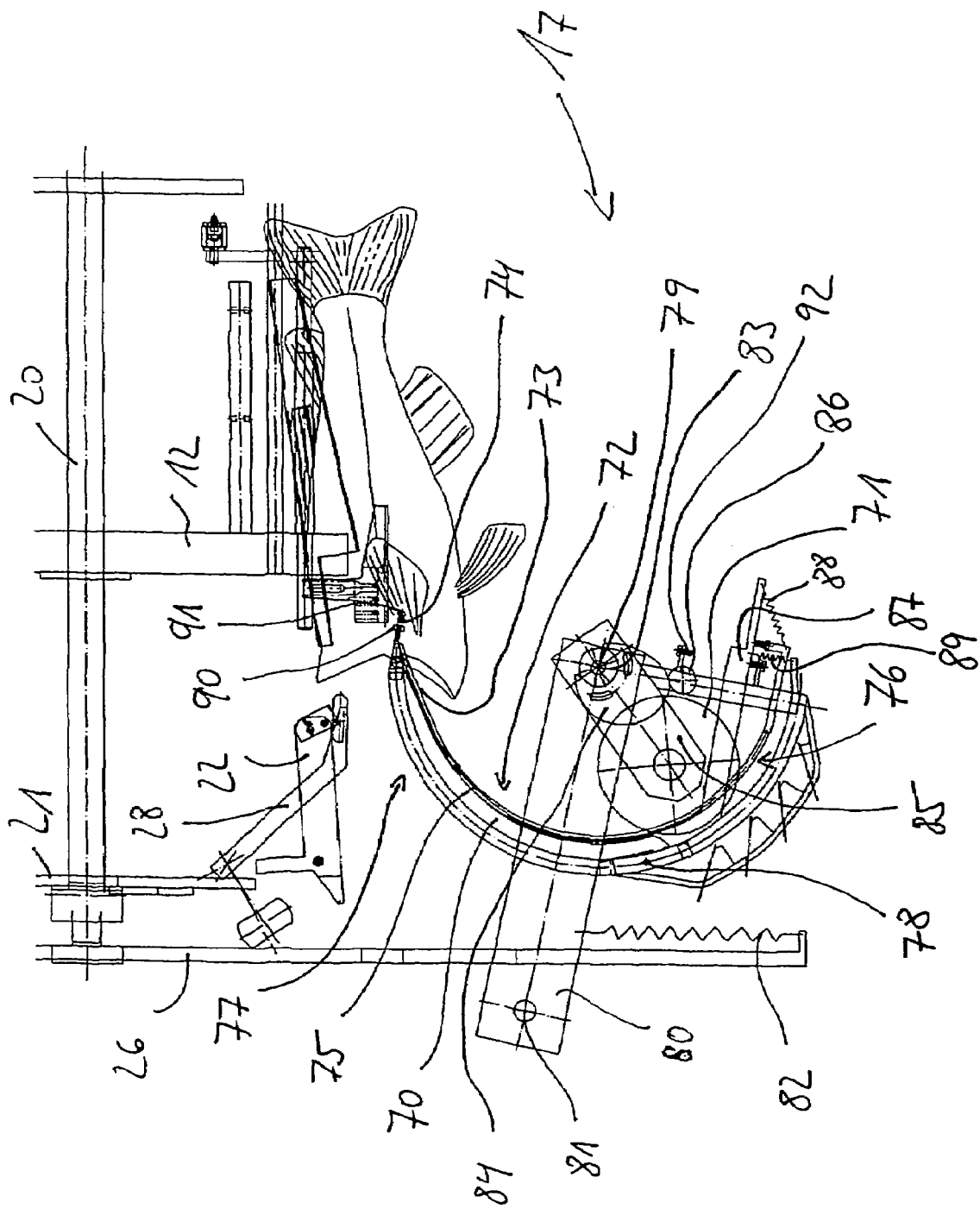
Figure 18:
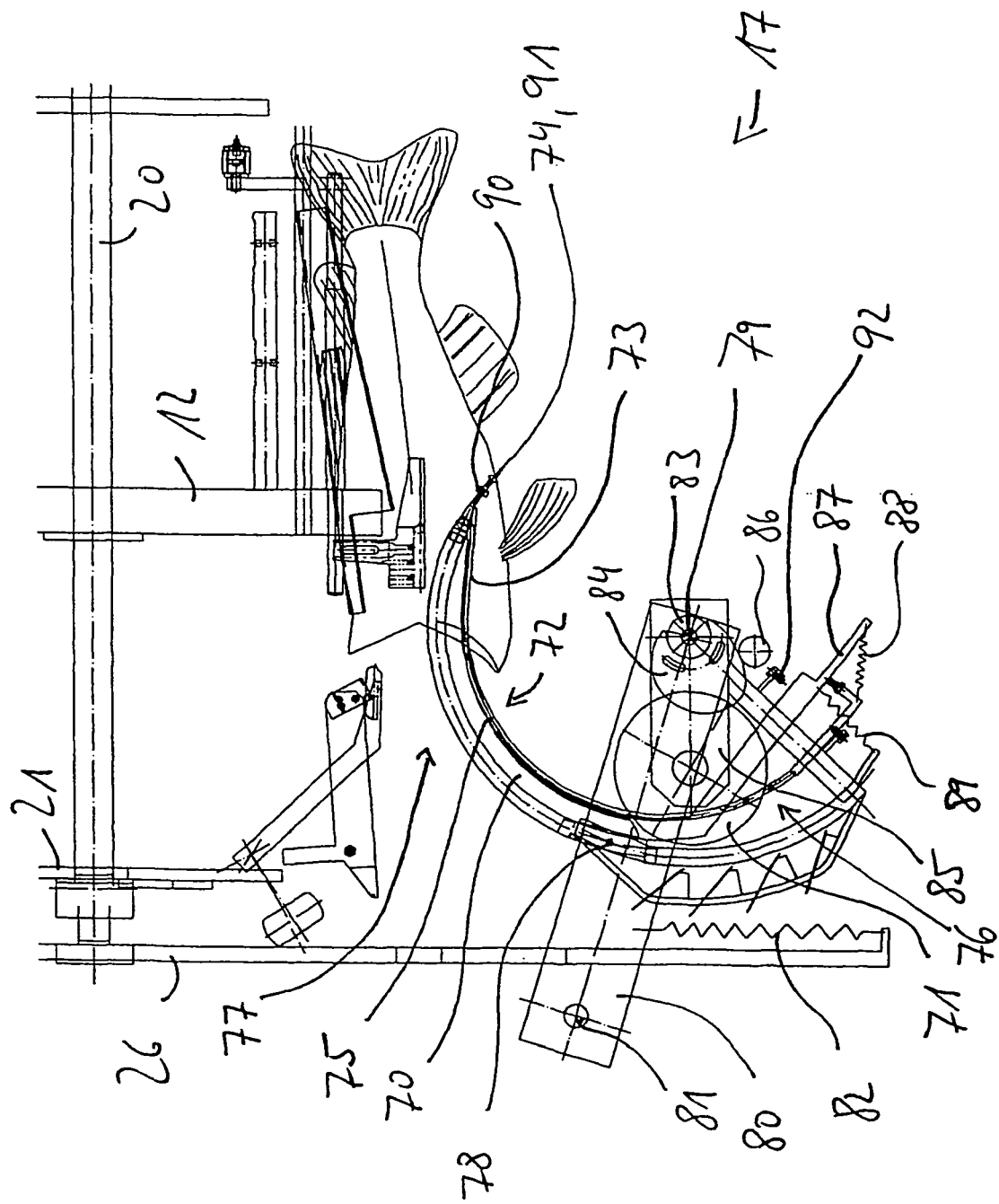
Figure 19:
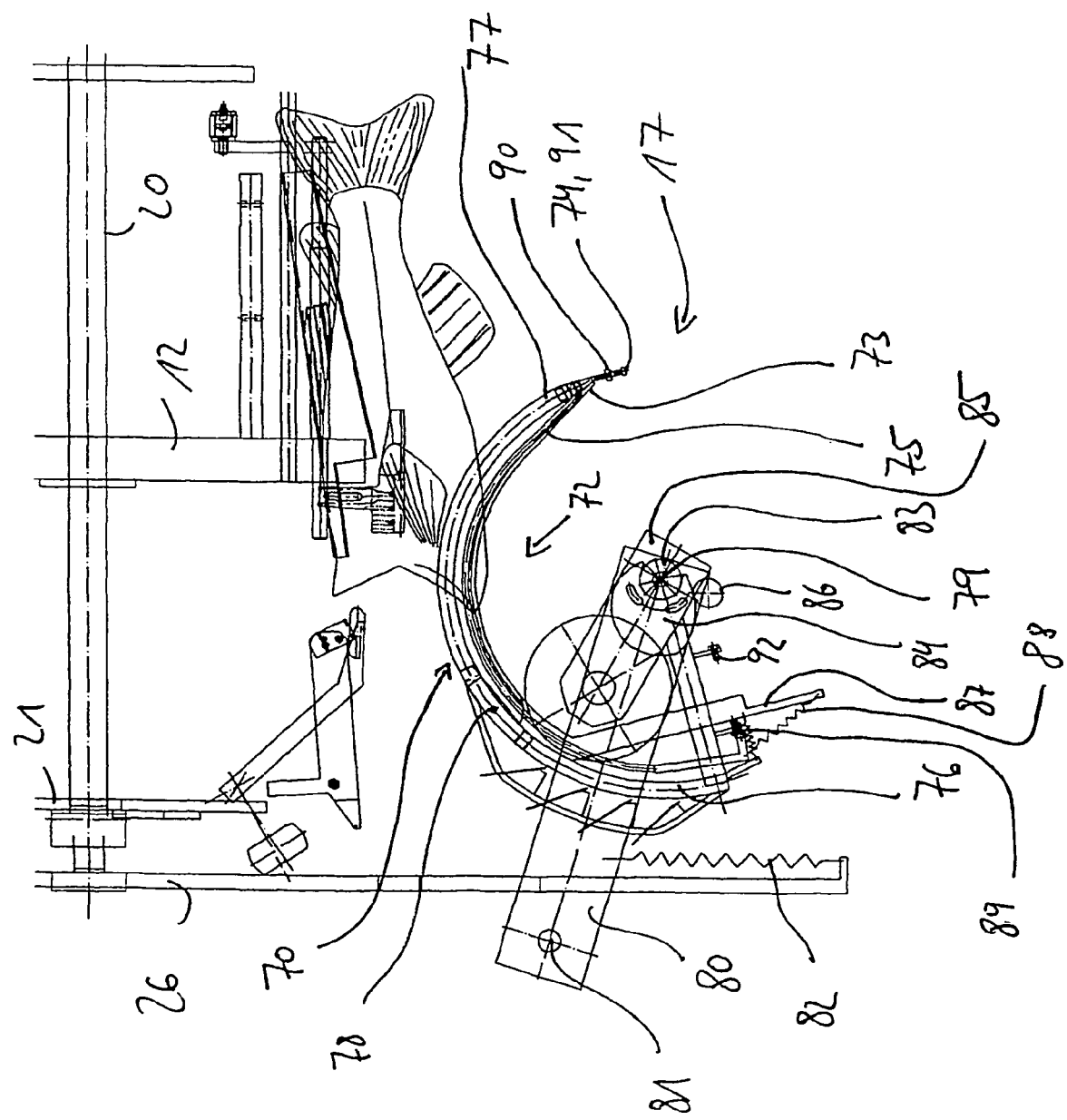
Figure 20:
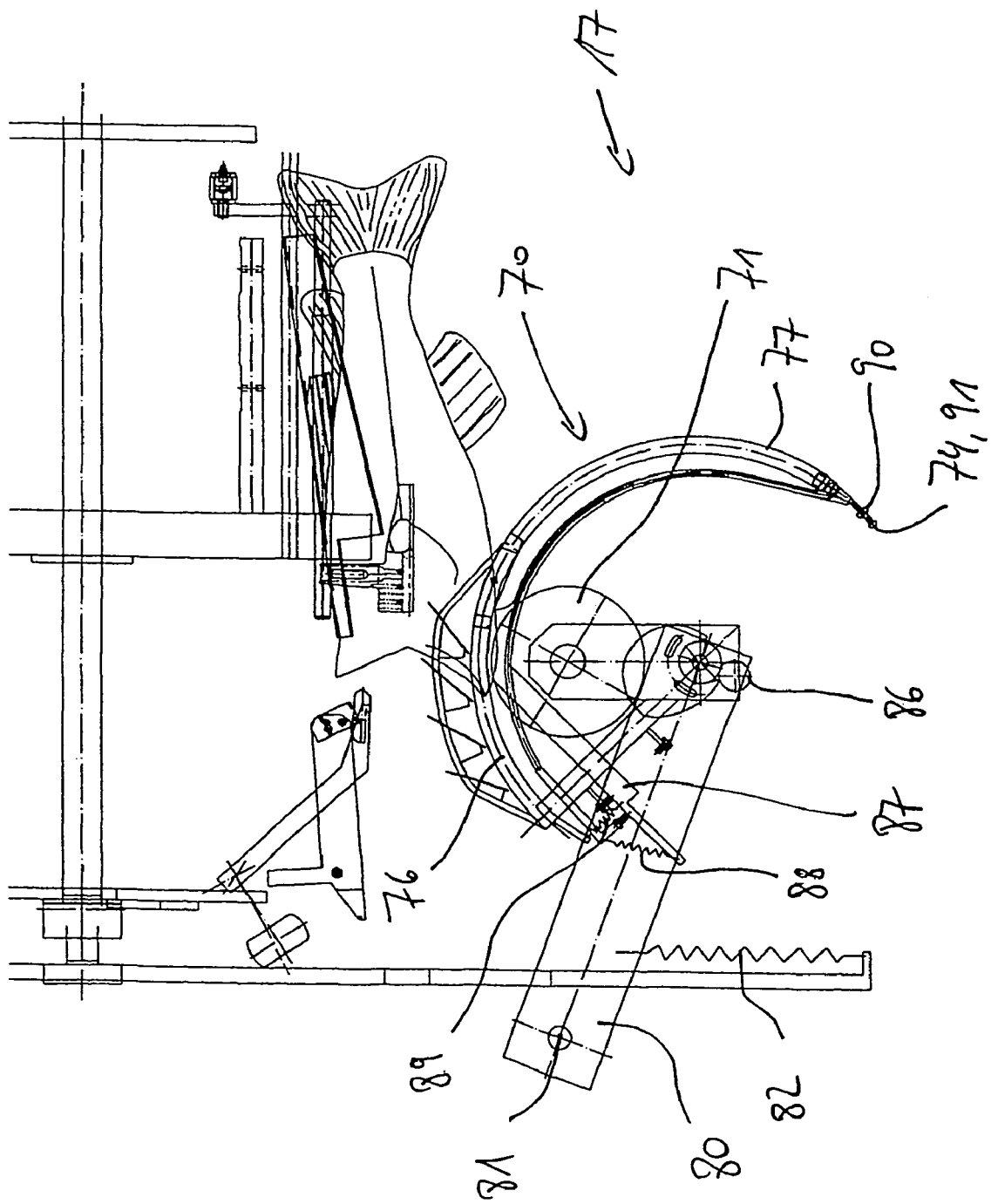

As soon as the fish receiving drum 12 has reached the processing position, it stops so that the throat cut can be performed on the stationary fish. For this, the throat cutting apparatus 13 or the circular blade 29 with the blade cover 30 travels down. In the process the throat cutting apparatus 13 moves on an experimentally determined circular path 60, wherein the circular path 60 is selected such that fish of different size, preferably within a size range from 35 to 90 cm, can be processed without machine adjustment or conversion. Following the circular path 60, first the blade cover 30 impinges on the fish and presses the head of the fish round the stationary edge of the back support. The sprung head support 22 yields and is also pressed downwards. The blade cover 30 accordingly engages the fish from the outside, this being on the connecting web 65 between the collarbone tip 35 and the connecting point 66 of the gills (see FIG. 16). As a result the skin in front of the collarbone tip 35, that is, the region facing towards the circular blade 29, is stretched so that the throat cut can be made without the collarbone tip 35 being damaged and without gill residues remaining on the collarbone. During the throat cut the gill arch is repelled by the blade cover 30, that is, kept out of the cutting or working region of the circular blade 29.

By the method according to the invention, the throat cutting apparatus 13 or the circular blade 29 seeks the optimum point for the throat cut, this being optimised for a fish length range from about 35 to 90 cm. As soon as the circular blade 29, which impinges on the stretched skin almost at right angles, has started cutting the fish, the head clamp 28 comes down and clamps the head between head support 22 and head clamp 28. Apart from fixing, orientation/positioning of the head is performed due to the shape of the head support 22 and head clamp 28.

The throat cut or the depth of the throat cut is precisely the same, independently of the fish size. The cutting depth is fixed with reference to the smallest fish to be processed. In other words this means, the bigger the fish, the deeper the throat cut. The circular path 60 on which the throat cutting apparatus 13 and hence the circular blade 29 move is as far as possible away from the collarbone tip 35. This has the advantage that the tolerances which the collarbones have in their length—even within a fish size range—can be ignored, or all tolerances lie in front of the circular path 60, so that the collarbone tip 35 is reliably not damaged.

After the throat cut the throat cutting apparatus 13 moves back into its original position releasing the fish. Only then does the fish receiving drum 12 rotate through about 45° into the next processing position. During the movement of the fish receiving drum 12 into the region of the pharynx cutting apparatus 14, the guide, this being first the fixed element 31 and then the movable element 32, engages in the throat cut. In the process the collarbone tips 35 are as it were threaded on and pressed in the tail direction or out of their original position, the position of the fish itself remaining unchanged on account of the torso clamp 25.

With the fixed, rigid element 31, the collarbones are only oriented or pre-positioned. The movable, rotatably mounted element 32 ensures that fish of different size and hence having differently positioned collarbones or tips 35 are brought to a precise position. But at the same time it must be ensured that the region between the collarbone tip 35 and the middle bone remains largely free, that is, is not covered by the guide 15 or the arm 34 of the movable element 32. As the collarbone or collarbone tip 35 deflects the movable element 32 upwards, the cutting region for the pharynx cut remains sufficiently free. In other words, the collarbone entrains the movable element 32, so that the element 32 is deflected further upwards with a large fish than with a small fish. It is however important that the element 32 firstly protects the collarbone tip 35 and secondly keeps the cutting region free. This ensures that the circular blade 37 comes up to the membrane which has grown over the liver. For when the membrane cannot be detached from the fish torso, subsequent removal of the entrails also proves difficult.

As soon as the fish receiving drum 12 is in the rest position, the pharynx cutting apparatus 14 travels also on an experimentally determined circular path 61. In the process the circular blade 37 which is covered by the blade cover 38 moves to the collarbone, so that the blade cover 38 moves hard along the collarbones. In the process the circular blade 37 with the blade cover 38 enters immediately below the movable element 32 or below the arm 34 into the region between collarbones and middle bone. By this cut, first the membrane is cut and then the pharynx. To ensure that the pharynx is also completely severed, the pharynx cutting apparatus 14 stops at the bottom point of the circular path 61, wherein the fish receiving drum 12 is already moving into the next processing position. The stopped position of the pharynx cutting apparatus 14 at the lowest point is slightly laterally offset from the centre axis of the fish. In this position located behind the middle bone in the direction of transport, the pharynx cutting apparatus 14 stops at the lowest point of the circular path 61, but with the circular blade 37 rotating. Due to movement of the fish by the stopped but rotating circular blade 37, there is almost linear guiding of the cut, so that the pharynx is also severed in the edge regions. Before the next fish reaches the pharynx cutting apparatus 14, the latter is moved back into its original position outside the transport or working region of the fish receiving drum 12.

With the movement of the fish in the fish receiving drum 12 from the pharynx cutting apparatus 14 to the heading apparatus 16, heading of the fish begins. For this purpose a guide engages in the plane of the pharynx cut. This guide merges with the blade cover 40 of the circular blade 39 which takes over continued guiding. During the movement of the fish by the stopped but rotating circular blade 39, the head is completely severed from the torso, this being before the fish receiving drum 12 has reached the next stopping position at the slaughtering apparatus 17. Due to the fact that both the head and the torso are respectively fixed, so that no displacement of one of the parts is possible, precise guiding of the cut takes place. After severing, the head can be carried away at any position by opening the head clamp 28. During the system-related stopping phase (intermittent movement) of the fish receiving drum 12 in the region of the circular blade 39, the latter rotates without function in the already finished heading cut.

Travel of the fish receiving drum 12 from the heading apparatus 16 to the slaughtering apparatus 17 also takes place without function. During slaughter of the fish in the region of the slaughtering apparatus 17, the fish receiving drum 12 stops. As soon as the stopping position is reached, again about 45° offset from the heading position, the curved slaughter knife 41 engages with its knife tip 44 from the head side in the abdominal cavity which has been opened between the collarbones. As soon as the knife tip 44 has entered the abdominal cavity, the whole curved slaughter knife 41 is lowered in such a way that the knife tip 44 rests on the inside of the abdominal cover of the fish. Due to the arrangement of the curved slaughter knife 41 already described above, it moves by rotation first in the longitudinal direction, that is, in the tail direction of the fish. In the process the whole link 49 moves anti-clockwise about the pivot point 50. The rotational movement of the curved slaughter knife 41 is therefore converted to a linear movement by lifting it at least in the region of the knife tip 44. In the process the cam plate by means of which the curved slaughter knife 41 is basically guided leaves the corresponding roller, so that the curved slaughter knife 41 or the whole slaughtering apparatus 17 including the link 49 is at least temporarily freely movable during the linear movement of the knife tip 44. The larger the fish to be processed, the greater the deflection of the curved slaughter knife 41.

The knife tip 44 slides/feels its way as it were over the abdominal cover in the direction of the anus opening. As soon as the ball 45 on the knife tip 44 has reached the anus, the curved slaughter knife 41 penetrates from the inside to the outside through the abdominal cover or anus. By further rotation of the curved slaughter knife 41, the cutting edge 43 on the inner side 42 of the curved slaughter knife 41 begins to cut open the abdominal cover from the anus in the direction of the head. In the event that additional means 62 are arranged directly behind the ball 45, before the actual abdominal cut, first the connecting element between gut and anus is severed so that the connection between the gut and the fish torso is broken.

However, immediate initial cutting of the abdominal cover is at first prevented by the blade covers 46, 47 arranged on both sides of the cutting edge 43. The cutting edge 43 is not released until the abdominal skin has deflected upwards the spring-loaded and pivotable blade covers 46, 47. By the pressure of the blade covers 46, 47 on the abdominal skin, the latter is stretched. Furthermore, this pressure leads to centring of the fish and particularly of the abdominal cover, so that the slaughter cut is made centrally or symmetrically. Now the entrails 67 drop by their own weight out of the open abdominal cavity. In the event that the entrails 67 remain in the abdominal cavity, for example because they are grown over, reamers on the outer sides of the curved slaughter knife 41 ensure that the entrails 67 pass through the open abdominal cover to the outside.

In the embodiment of the slaughtering apparatus 17 described in FIGS. 17 to 20, the curved slaughter knife 70 engages with its knife tip 74 from the head side in the abdominal cavity opened between the collarbones. By clockwise rotation of the curved slaughter knife 70 about the pivot point 79, the knife tip 74 is lowered and rests on the inside of the abdominal cover of the fish. The point at which the knife tip 74 impinges on the abdominal cover is defined by means of the cam shape of the cam plate 84. In any case it is ensured that the knife tip 74 rests on the abdominal cover in front of the anus or anus opening. After resting of the knife tip 74, the curved slaughter knife 70 moves further about the pivot point 79, while the knife tip 74 essentially moves in the linear direction. The resistance of the abdominal cover again causes conversion of rotation to linear movement. But in this embodiment it is not the whole link 80 that pivots about the pivot point 81, but only the tip portion 77 about the pivot point 78. The degree of freedom of the curved slaughter knife 70 is therefore limited only to a given range. In other words this means that only the tip portion 77 of the curved slaughter knife 70 pivots or is deflected about the pivot point 78 as a function of the fish size, while the main portion 76 continues to perform a given rotational movement along the cam plate 84.

As soon as the load on the tip portion 77 subsides, either because the knife tip 74 passes through the anus or the knife tip 74 comes up behind the anus through the abdominal cover (and so the counter-pressure generated by the abdominal cover is eliminated), the spring 89 causes the tip portion 77 to move back into its original position. In the event that the curved slaughter knife 70 passes out of the abdominal cover only behind the anus, e.g. in the case of pollack with a stable abdominal skin, there is provided a stop 92 which limits the deflection of the tip portion 77, and so the "opening" of the radius, by the fact that the lever arm 87 strikes the stop 92. As soon as the tip portion 77 strikes the stop 92, the knife tip 77 again follows the rotational movement of the main portion 76. The position or construction of the stop 92 depends on the desired exit position of the curved slaughter knife 70 and is variable. The stop 92 guarantees that the curved slaughter knife 70 in any case leaves the abdominal cover.

By further rotation of the curved slaughter knife 70, the cutting edge 73 begins to cut open the abdominal cover from the rear in the direction of the head, from the inside to the outside. However, immediate initial cutting of the abdominal cover by the blade cover 75 arranged on both sides is prevented. The cutting edge 73 is not released until the abdominal cover has deflected upwards the spring-loaded and pivotable blade covers 75. In the process the spring 88 is stretched. The effects caused by the blade cover 75 have already been described on the first embodiment of the slaughtering apparatus 17. After the abdominal cut, when the pressure on the blade cover 75 subsides, the spring 88 ensures that the blade cover 75 is pulled back down, that is, in front of the cutting edge 73.

Due to the continuous rotation of the curved slaughter knife 70 about the pivot point 79, depending on the size of the fish to be processed, finally also the circular blade 71 becomes engaged and completely opens the abdominal cover. With smaller fish the abdominal cover is basically already completely severed or opened by the cutting edge 73. With larger fish a small web may be left between the anus and the opening of the abdominal cavity, which web is then reliably severed by the circular blade 71, so that then the entrails left in the abdominal cavity can hang down from the fish torso.

Travel of the fish receiving drum 12 from the slaughtering apparatus 17 to the gut severing apparatus 19 which is offset about 45° takes place without function. In the region of the gut severing apparatus 19 the fish is then horizontal, this being with the open abdominal cavity oriented downwards.

Paddles 51 arranged below the fish receiving drum 12 rotate circumferentially. The paddles 51 catch the entrails 67 which are hanging down and clamp them between themselves and the support 53. For this purpose the support 53 is magnetically loaded. This means that the clamping force decreases with increasing distance between the paddle 51 and the support 53, until after a given distance it completely disappears. This ensures that foreign bodies which become clamped between the paddle 51 and the support 53 do not lead to machine damage or a breakdown. In addition the support 53 is spring-loaded, wherein the spring force serves only to pull the support 53 back into the actual clamping position in the event that the magnetic force has been overcome.

Due to the rotary movement of the paddles 51 combined with clamping, the entrails 67 which are joined to the torso only via the gut at the anus are pulled en bloc out of the abdominal cavity. The entrails 67 detached from the abdominal cavity by tensile force are collected in a container and carried away. Upon rotation of the fish receiving drum 12 into the next position, the torso clamp 25 opens so that the torsos are released and drop out of the fish receptacle 11. The torsos are then collected and carried away.

It is also possible to omit individual steps of the method, particularly heading, for example by dismounting individual apparatuses such as the heading apparatus 16. Throat cutting too can be omitted by dismounting the throat cutting apparatus 13. The method or the individual steps of the method are in each case determined by the desired requirements. Basically, processing of the fish takes place in parallel at the individual processing stations, so that the stopping times at the individual processing stations are used particularly effectively.

The invention claimed is:

1. A device for slaughtering fish, including at least one fish receptacle for positioning and receiving the fish, a throat cutting apparatus for cutting through the throat in preparation for the pharynx cut, a pharynx cutting apparatus for completely cutting through the pharynx, a slaughtering apparatus for opening the abdominal cavity, a gut severing apparatus for releasing the entrails from the abdominal cavity, and a peripheral fish receiving drum with which the fish can be moved to the individual processing stations, wherein the fish receiving drum, which is driven intermittently, is rotatable about a horizontal shaft, wherein the device moves the fish in an essentially circular path around a horizontal shaft such that longitudinal axes of the fish are substantially parallel with said horizontal shaft, wherein the fish receptacle includes pectoral fin receptacles for positioning the fish and a torso clamp for fixing the fish torsos and, in addition to each fish receptacle, a spring-loaded head support is provided in association with a head clamp which clamps the head of the fish in a sandwich fashion between itself and the spring-loaded head support, and wherein the spring-loaded head support is pivotable about a pivot point.

2. The device according to claim 1, wherein in that in addition a heading apparatus is provided for severing the head from the torso.

3. The device according to claim 1, wherein the head support is of movable construction.

4. The device according to claim 1, wherein the head clamp is cam-controlled.

5. The device according to claim 4, wherein the head clamp is spring-loaded and pivotable about a pivot point.

6. The device according to claim 5, wherein the throat cutting apparatus includes a circular blade with corresponding blade cover.

7. The device according to claim 4, wherein the throat cutting apparatus or the circular blade is movable on a circular path.

8. The device according to claim 4, wherein, between the throat cutting apparatus and the pharynx cutting apparatus are provided means for positioning the collarbones.

9. The device according to claim 8, wherein the pharynx cutting apparatus includes a circular blade with corresponding blade cover.

10. The device according to claim 9, wherein the pharynx cutting apparatus or the circular blade is movable on a circular path.

11. The device according to claim 1, wherein by means of the pharynx cutting apparatus or a guide immediately in front of the pharynx cutting apparatus the collarbones can be positioned.

12. The device according to claim 2, wherein the heading apparatus includes a circular blade mounted in a stationary position with a blade cover.

13. The device according to claim 12, wherein the circular blade is driven in rotation.

14. The device according to claim 1, wherein the slaughtering apparatus includes a curved slaughter knife.

15. The device according to claim 14, wherein the curved slaughter knife is blunt including being ball-shaped at tip of the knife.

16. The device according to claim 1, wherein the curved slaughter knife on an inner side thereof is sharp-edged, the cutting edge being covered by a blade cover.

17. The device according to claim 16, wherein the blade cover is spring-loaded.

18. The device according to claim 17, wherein the blade cover is arranged on both sides of the cutting edge.

19. The device according to claim 18, wherein the curved slaughter knife on its outer sides comprises reamers.

20. The device according to claim 15, wherein the region behind the knife tip are provided additional cutting means.

21. The device according to claim 20, wherein the curved slaughter knife is of movable construction such that it can be lowered.

22. The device according to claim 21, wherein the curved slaughter knife is additionally constructed so as to be rotatable about a pivot point.

23. The device according to claim 22, wherein the curved slaughter knife is arranged on a link, the link being pivotable about a pivot point.

24. The device according to claim 23, wherein in addition to the curved slaughter knife the slaughtering apparatus includes a circular blade.

25. The device according to claim 14, wherein the curved slaughter knife is constructed in two portions and consists of a main portion and a tip portion.

26. The device according to claim 25, wherein the curved slaughter knife is arranged on a shaft.

27. The device according to claim 26, wherein on the shaft in addition are arranged a cam plate and a swivel arm.

28. The device according to claim 27, wherein corresponding to the cam plate is provided a roller over which the cam plate can roll, the roller being arranged stationarily.

29. The device according to claim 28, wherein during the rotational movement the curved slaughter knife follows a fixed curve corresponding to the cam plate.

30. The device according to claim 29, wherein at least the tip portion of the curved slaughter knife is spring-loaded and pivotable or deflectable about a pivot point.

31. The device according to claim 30, wherein the tip portion has a stop.

32. The device according to claim 31, wherein the tip portion has a lever arm which cooperates with the stop.

33. The device according to claim 32, wherein at the free end of the swivel arm is arranged a circular blade.

34. The device according to claim 33, wherein at the lowermost position of the fish receiving drum, behind the slaughtering apparatus in the direction of transport, are arranged means for removing the entrails.

35. The device according to claim 34, wherein the means include movable flaps and a support.

36. The device according to claim 35, wherein the support is magnet-loaded and spring-loaded.

37. The device according to claim 1, wherein the head clamp is spring-loaded and pivotable about a pivot point.

38. The device according to claim 2, wherein the head clamp is spring-loaded and pivotable about a pivot point.

39. The device according to claim 3, wherein the head clamp is spring-loaded and pivotable about a pivot point.

40. A method for slaughtering fish, including the steps of:
laying the fish in fish receptacles of a fish receiving drum,
cutting open the throats of the fish in preparation for the pharynx cut by means of a throat cutting apparatus,
completely cutting through the pharynx with a pharynx cutting apparatus,
opening the abdominal cavity with a slaughtering apparatus,
releasing the entrails with a gut severing apparatus,
wherein the fish with the fish receiving drum, which rotates about a horizontal shaft so that the fish are moved on an essentially circular path, are moved successively and intermittently to the individual processing stations, wherein longitudinal axes of the fish are generally parallel to the horizontal shaft and wherein the fish are
transported such that their longitudinal axes are substantially parallel with the horizontal shaft,
positioned by means of their pectoral fins,
fixed in the region of their torsos, and
additionally supported at their heads in the fish receptacles of the fish receiving drum, and wherein
the head is fixed to a head support, the head support being provided in association with a head clamp which clamps the head of the fish in a sandwich fashion between itself and the head support.

41. The method according to claim 40 wherein the throat cut is performed from the outside in such a way that the throat cutting apparatus is applied to the fish from the outside.

42. The method according to claim 41, wherein the head and the web between the collarbone tip and the connecting point of the gills, of a fish, are pushed down before the throat cut, so that the skin in the region of the collarbone tip is stretched.

43. The method according to claim 42, wherein the throat cutting apparatus, after the throat cut, moves into its original position, so that the fish receiving drum can be moved on.

44. The method according to claim 43, wherein during the movement of the fish from the throat cutting apparatus to the pharynx cutting apparatus a guide engages in the throat cut, pressing the collarbones into a precise position.

45. The method according to claim 40, wherein the pharynx cutting apparatus following a circular path first severs the membrane between the collarbones and only then cuts the pharynx.

46. The method according to claim 45, wherein the pharynx cutting apparatus remains in a lower position of the circular path while the fish receiving drum moves on in the direction of a heading apparatus.

47. The method according to claim 46, wherein the pharynx cutting apparatus is moved into its original position before the next fish arrives for pharynx cutting.

48. The method according to claim 47, wherein after severing the pharynx the fish are headed with a heading apparatus.

49. The method according to claim 48, wherein during the movement of the fish from the pharynx cutting apparatus to the heading apparatus a guide engages in the pharynx cut.

50. The method according to claim 49, wherein, for heading, the fish is removed by a stationarily mounted, rotating circular blade.

51. The method according to claim 50, wherein the abdominal cavity is opened by a curved slaughter knife, the cut being made from the inside to the outside.

52. The method according to claim 51, wherein opening of the abdominal cavity is effected from the rear, that is, from the tail, to the front, that is, in the direction of the head.

53. The method according to claim 52, wherein the curved slaughter knife enters from the head side into the abdominal cavity which has been opened between the collarbones.

54. The method according to claim 53, wherein the curved slaughter knife is lowered after entering the abdominal cavity, so that it rests on the inside of the abdominal skin.

55. The method according to claim 54, wherein the curved slaughter knife upon further rotation is at least partially moved essentially linearly.

56. The method according to claim 55, wherein the curved slaughter knife is deflected only in the region of the knife tip.

57. The method according to claim 56, wherein curved slaughter knife is moved knife tip first in the direction of the anus or beyond it in the tail direction.

58. The method according to claim 57, wherein the curved slaughter knife penetrates through the abdominal skin from the inside to the outside in the region of the anus or behind it.

59. The method according to claim 58, wherein the curved slaugther knife cuts the abdominal cover open upon further rotation.

60. The method according to claim 59, wherein the abdominal skin in the region of the opening of the abdominal cavity is finally severed by means of a circular blade.

61. The method according to claim 60, wherein after severing the abdominal skin the entrails are cleared out in such a way that they are joined to the fish only via the gut in the region of the anus.

62. The method according to claim 61, wherein the entrails are detached all together en bloc from the fish body.

63. The method according to claim 62, wherein the entrails are clamped and pulled off by a pulling movement/tensile force.

64. The method according to claim 63, wherein the head and/or the fish torso can be carried away at any position of the fish receiving drum.

65. The method according to claim 64, wherein the fish are processed simultaneously at the respective processing stations.

* * * * *

UNITED STATES PATENT AND TRADEMARK OFFICE
CERTIFICATE OF CORRECTION

PATENT NO. : 7,056,202 B2  
APPLICATION NO. : 10/468024  
DATED : June 6, 2006  
INVENTOR(S) : Roland Pein Page 1 of 1

It is certified that error appears in the above-identified patent and that said Letters Patent is hereby corrected as shown below:

1) Please change the spelling of the sole inventor from "Ronald Pein" to -- Roland Pein--.

2) Please add a comma in the title of the invention as follows:

METHOD AND DEVICE FOR SLAUGHTERING FISH, IN PARTICULAR WHITE FISH

Signed and Sealed this

Fourteenth Day of November, 2006

JON W. DUDAS  
*Director of the United States Patent and Trademark Office*